United States Patent
Zhu et al.

(10) Patent No.: US 12,022,069 B2
(45) Date of Patent: Jun. 25, 2024

(54) VIDEO ENCODING METHOD AND APPARATUS, VIDEO DECODING METHOD AND APPARATUS, ELECTRONIC DEVICE, AND STORAGE MEDIUM

(71) Applicant: Tencent Technology (Shenzhen) Company Limited, Guangdong (CN)

(72) Inventors: Han Zhu, Guangdong (CN); Xiaozhong Xu, Guangdong (CN); Shan Liu, San Jose, CA (US)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 176 days.

(21) Appl. No.: 17/719,027

(22) Filed: Apr. 12, 2022

(65) Prior Publication Data

US 2022/0239910 A1 Jul. 28, 2022

Related U.S. Application Data

(63) Continuation of application No. PCT/CN2021/092029, filed on May 7, 2021.

(30) Foreign Application Priority Data

May 25, 2020 (CN) .......................... 202010449583.1

(51) Int. Cl.
  *H04N 19/00* (2014.01)
  *H04N 19/117* (2014.01)
  (Continued)

(52) U.S. Cl.
  CPC ......... *H04N 19/117* (2014.11); *H04N 19/147* (2014.11); *H04N 19/149* (2014.11); *H04N 19/176* (2014.11)

(58) Field of Classification Search
  CPC .. H04N 19/117; H04N 19/147; H04N 19/149; H04N 19/176; H04N 19/172;
  (Continued)

(56) References Cited

U.S. PATENT DOCUMENTS 10,469,869 B1 * 11/2019 Li ........................ H04N 19/577
10,609,384 B2 * 3/2020 Chen ...................... H04N 19/52
(Continued)

FOREIGN PATENT DOCUMENTS

CN 108184129 A 6/2018
CN 111052740 A 4/2020

OTHER PUBLICATIONS

Extended European Search Report for corresponding application No. EP 21813453.4 dated Dec. 8, 2022, 8p.
(Continued)

*Primary Examiner* — Frank F Huang
(74) *Attorney, Agent, or Firm* — Crowell & Moring LLP

(57) ABSTRACT

Embodiments of this disclosure provide a video encoding and decoding method and devices relate to artificial intelligence technologies applied to video encoding and decoding, and are implemented to reduce decoding complexity and improve filtering efficiency when the video quality is not significantly affected by performing video filtering using machine learning technologies. The video encoding method may include obtaining a reconstructed video frame from encoded data of an encoded video frame, the encoded video frame comprising at least two encoding blocks; filtering the reconstructed video frame, to obtain filtering gains corresponding to the at least two encoding blocks; determining, according to a distribution of the filtering gains of the at least two encoding blocks, a target encoding block among the at least two encoding blocks that is to be filtered when being decoded at a decoder; and including into the encoded data of
(Continued)

the encoded video frame, an indication information for indicating that the target encoding block is to be filtered.

12 Claims, 7 Drawing Sheets

(51) Int. Cl.
*H04N 19/147* (2014.01)
*H04N 19/149* (2014.01)
*H04N 19/176* (2014.01)

(58) Field of Classification Search
CPC ...... H04N 19/46; H04N 19/82; H04N 19/119; G06N 3/045; G06N 3/063
See application file for complete search history.

(56) References Cited

U.S. PATENT DOCUMENTS

| | | | | |
|---|---|---|---|---|
| 10,638,144 | B2* | 4/2020 | Larumbe | G06V 10/84 |
| 11,206,428 | B1* | 12/2021 | Zhao | H04N 19/18 |
| 2005/0058197 | A1* | 3/2005 | Lu | H04N 19/40 |
| | | | | 375/240.03 |
| 2019/0273948 | A1 | 9/2019 | Yin et al. | |
| 2020/0244976 | A1* | 7/2020 | Zhao | H04N 19/196 |
| 2020/0296362 | A1* | 9/2020 | Chadwick | H04N 19/177 |
| 2020/0396487 | A1* | 12/2020 | Nalci | H04N 19/119 |
| 2021/0120252 | A1* | 4/2021 | Koo | H04N 19/122 |

OTHER PUBLICATIONS

Kim, Il-Koo et al., "HM7: High Efficiency Video Coding (HEVC) Test Model 7 Encoder Description", Output Document of Joint Collaborative Team on Video Coding (JCT-VC) of ITU-T SG16 WP3 and ISO/IEC JTC1/SC29/WG11, Document JCTVC-I1002, $9^{th}$ meeting, May 7, 2012, 42p, Geneva, CH.

Lin, Kai et al., "Residual in Residual Based Convolution Neural Network In-loop Filter for AVS3", 2019 Picture Coding Symposium, Nov. 15, 2019, 5p, Ningbo, CN.

International Search Report and Written Opinion mailed Jul. 28, 2021 for International Application No. PCT/CN2021/092029.

\* cited by examiner

VIDEO ENCODING METHOD AND APPARATUS, VIDEO DECODING METHOD AND APPARATUS, ELECTRONIC DEVICE, AND STORAGE MEDIUM

RELATED APPLICATION

This application is a continuation of and claims priority to International PCT Application No. PCT/CN2021/092029, filed on May 7, 2021, which is based on and claims priority to Chinese Patent Application No. 202010449583.1 filed on May 25, 2020, both entitled "VIDEO ENCODING METHOD AND APPARATUS, VIDEO DECODING METHOD AND APPARATUS, ELECTRONIC DEVICE, AND STORAGE MEDIUM". These prior applications are incorporated herein by reference in their entireties.

FIELD OF THE TECHNOLOGY

This application relates to the field of video processing technologies, and in particular, to a video encoding method and apparatus, a video decoding method and apparatus, an electronic device, and a storage medium.

BACKGROUND OF THE DISCLOSURE

In recent years, with the development of deep learning technologies, in many existing studies, it has been attempted to replace some modules in a conventional video coding framework with deep learning models, or implement an end-to-end coding framework based on deep learning, especially with respect to loop filtering tools, thereby significantly improving coding performance compared with conventional filtering tools. However, the use of the loop filtering tools based on deep learning increases the decoding complexity of a video decoding terminal. A current processing manner is to obtain a coding tree unit (CTU) with a gain boost through screening in a filtered video frame through rate distortion optimization (RDO), and to filter the CTU at the video decoding terminal.

SUMMARY

An embodiment of this disclosure provides a video encoding method, including:
  obtaining a reconstructed video frame from encoded data of a video frame, the video frame including at least two blocks;
  filtering the reconstructed video frame, to obtain gains obtained by filtering blocks in the reconstructed video frame;
  determining, according to a distribution of the gains of the blocks from the blocks, a block that needs to be filtered in a case of decoding the encoded data; and
  transmitting the encoded data of the video frame, the encoded data including indication information of a block that needs to be filtered.

An embodiment of this disclosure provides a video decoding method, including:
  obtaining encoded data of a video frame, the video frame including at least two blocks, the encoded data including indication information of a block that needs to be filtered, the indication information being determined according to a gain distribution of gains obtained by filtering the at least two blocks;
  obtaining a reconstructed video frame from the encoded data; and
  filtering, based on the indication information, a block that needs to be filtered in the reconstructed video frame.

An embodiment of this disclosure provides a video encoding apparatus, including:
  a decoding module, configured to obtain a reconstructed video frame from encoded data of a video frame, the video frame including at least two blocks;
  a filtering module, configured to filter the reconstructed video frame, to obtain gains obtained by filtering blocks in the reconstructed video frame;
  a screening module, configured to determine, according to a distribution of the gains of the blocks from the blocks, a block that needs to be filtered in a case of decoding the encoded data; and
  a transmission module, configured to transmit the encoded data of the video frame, the encoded data including indication information of a block that needs to be filtered.

An embodiment of this disclosure provides a video decoding apparatus, including:
  an obtaining module, configured to obtain encoded data of a video frame, the video frame including at least two blocks, the encoded data including indication information of a block that needs to be filtered, the indication information being determined according to a gain distribution of gains obtained by filtering the at least two blocks;
  a video decoding module, configured to obtain a reconstructed video frame from the encoded data; and
  a video filtering module, configured to filter, based on the indication information, a block that needs to be filtered in the reconstructed video frame.

An embodiment of this disclosure provides a video encoding method, including:
  obtaining a reconstructed video frame from encoded data of an encoded video frame, the encoded video frame including at least two encoding blocks;
  filtering the reconstructed video frame, to obtain gains obtained by filtering blocks in the reconstructed video frame, the filtered blocks being corresponding to the at least two encoding blocks;
  determining, according to a distribution of the gains of the filtered blocks from the at least two encoding blocks, an encoding block that needs to be filtered in a case of decoding the encoded video frame; and
  transmitting the encoded data of the encoded video frame, the encoded data of the encoded video frame including indication information of the encoding block that needs to be filtered.

An embodiment of this disclosure provides a video decoding method, including:
  obtaining encoded data of an encoded video frame, the encoded video frame including at least two encoding blocks, and the encoded data of the encoded video frame including indication information of an encoding block that needs to be filtered in the at least two encoding blocks;
  obtaining a reconstructed video frame from the encoded data of the encoded video frame; and
  filtering, based on the indication information, a block corresponding to the encoding block that needs to be filtered in the reconstructed video frame, to obtain a filtered block, the indication information being related to a distribution of a gain of the filtered block.

An embodiment of this disclosure further provides a video encoding apparatus, including:

a decoding module, configured to obtain a reconstructed video frame from encoded data of an encoded video frame, the encoded video frame including at least two encoding blocks;

a filtering module, configured to filter the reconstructed video frame, to obtain gains obtained by filtering blocks in the reconstructed video frame, the filtered blocks being corresponding to the at least two encoding blocks;

a screening module, configured to determine, according to a distribution of the gains of the filtered blocks from the at least two encoding blocks, an encoding block that needs to be filtered in a case of decoding the encoded video frame; and a transmission module, configured to transmit the encoded data of the encoded video frame, the encoded data of the encoded video frame including indication information of the encoding block that needs to be filtered.

An embodiment of this disclosure provides a video decoding apparatus, including: an obtaining module, configured to obtain encoded data of an encoded video frame, the encoded video frame including at least two encoding blocks, and the encoded data of the encoded video frame including indication information of an encoding block that needs to be filtered in the at least two encoding blocks;

a video decoding module, configured to obtain a reconstructed video frame from the encoded data of the encoded video frame; and a video filtering module, configured to filter, based on the indication information, a block corresponding to the encoding block that needs to be filtered in the reconstructed video frame, to obtain a filtered block, the indication information being related to a distribution of a gain of the filtered block.

An embodiment of this disclosure provides an electronic device, including a memory, a processor, and a computer program stored in the memory and runnable on the processor, the processor, when executing the computer program, implementing the operations in the method according to any of the above.

An embodiment of this disclosure provides a computer-readable storage medium, storing computer program instructions, the computer program instructions, when executed by a processor, implementing the operations in the method according to any of the above.

In the video encoding method and apparatus, the video decoding method and apparatus, the electronic device, and the storage medium provided in the embodiments of this disclosure, after completing encoding of a video frame, a video encoding terminal obtains a reconstructed video frame from encoded data of the video frame, filters the reconstructed video frame, to obtain gains brought by filtering blocks in the video frame, and obtains a block with a larger gain through screening according to a distribution of the gains of the blocks, so that a video decoding terminal only filters the block with the larger gain during decoding, and does not filter a block with a smaller gain. On the premise of increasing the gains of the filtered video frame as much as possible, a quantity of blocks participating in filtering is reduced. In a case that the video quality is hardly affected or the video quality is not obviously degraded, the decoding complexity is reduced, and the filtering efficiency is improved.

BRIEF DESCRIPTION OF THE DRAWINGS

To describe the technical solutions in the embodiments of this disclosure more clearly, the following briefly describes the accompanying drawings required in the embodiments of this disclosure. Apparently, the accompanying drawings in the following description show merely some embodiments of this disclosure, and a person of ordinary skill in the art may derive other drawings from these accompanying drawings without creative efforts.

DESCRIPTION OF EMBODIMENTS

To make the objectives, technical solutions, and advantages of the embodiments of this disclosure more comprehensible, the following disclosure describes the technical solutions in the embodiments of this disclosure with reference to the accompanying drawings in the embodiments of this disclosure. Any quantification of elements in the accompanying drawings is merely an example rather than a limitation.

YUV represents a color space. "Y" represents luminance or luma, that is, a grayscale value. "U" and "V" represent chrominance or chroma, and describe color and saturation level of an image for at each pixel.

Video signal: From video signal may be acquired into two manners: camera capturing and computer generation. Due to different statistical characteristics of the two manners, corresponding compression coding schemes may also be different.

Figure 1:
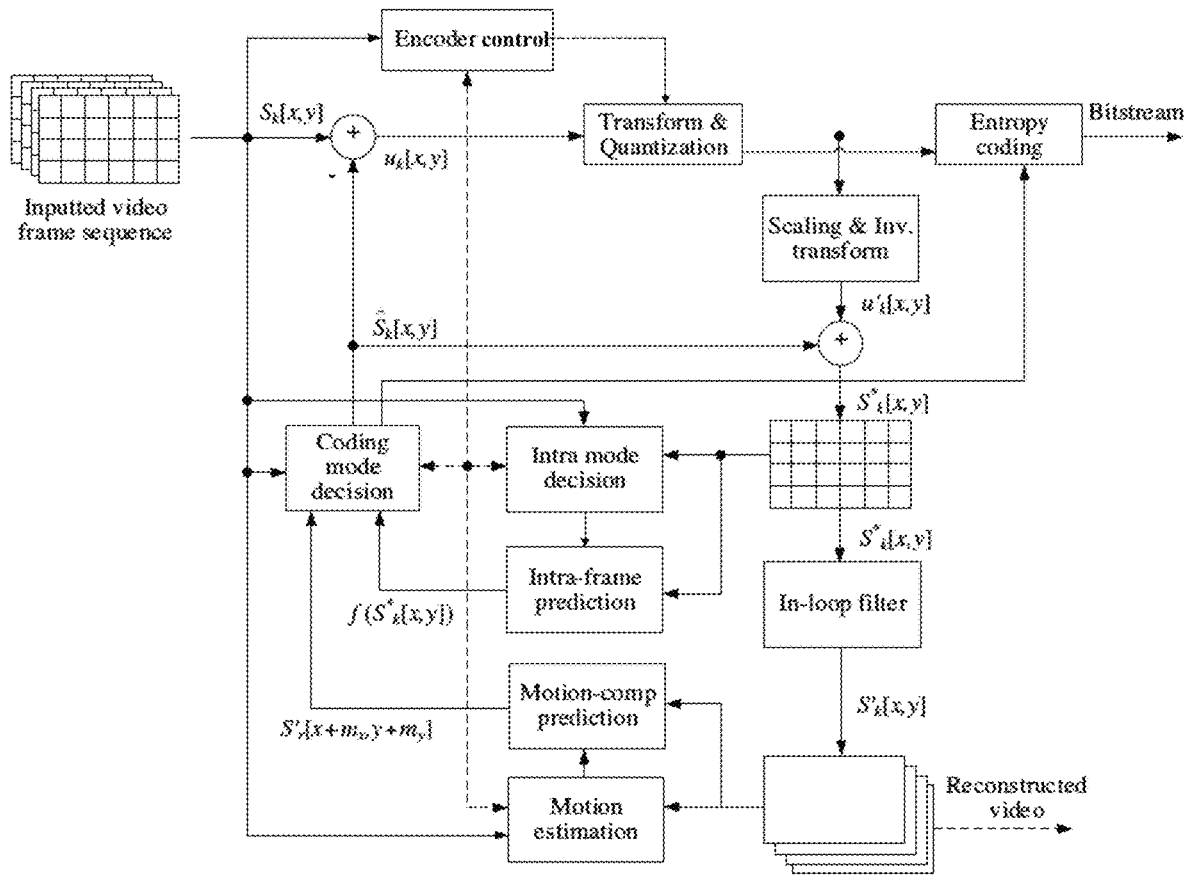
FIG. 1 is a basic flowchart of an exemplary video encoder.

FIG. 1 is a basic flowchart of an exemplary video encoder. Referring to FIG. 1, in modern mainstream video coding technologies, and by using the international video coding standards High Efficiency Video Coding (HEVC) and Versatile Video Coding (VVC) and the China national video coding standard Audio Video Coding Standard (AVS) as an example, a series of operations and processing are performed on an inputted original video signal by using a hybrid coding framework as follows:

(1) Block Partition Structure:

According to a size of an input image, the input image may be divided into several non-overlapping processing units, and each processing unit performs a similar compression operation. The processing unit may be a coding tree unit (CTU) or a largest coding unit (LCU). Each CTU may further continue to be divided more finely into one or more basic coding units, which are referred to as coding units (CUs). The CU is a most basic element in a coding stage. Various coding manners that may be used for the CU are described as follows:

(2) Predictive Coding:

Predictive coding includes manners such as intra-frame prediction and inter-frame prediction. In the predictive coding, an original video signal is subjected to prediction of a selected reconstructed video signal, to obtain a residual video signal. A video encoding terminal needs to select a most suitable one for a current CU from many possible predictive coding modes, and informs a video decoding terminal.

Intra-frame prediction: A prediction signal of a current block (or a current CU) is from an encoded and reconstructed region within a current image in which the current CU is located, that is, a position that best matches the current block and is found from a current frame, and refers to information in a spatial domain.

Inter-frame prediction: A prediction signal of a current block (or a current CU) is from another image (referred to as a reference image, or a reference frame) that have been encoded and is different from a current image, and refers to information in a time domain. For example, inter-frame prediction includes: motion estimation (ME) and motion compensation (MC). The motion estimation refers to determining a best corresponding image block of a currently to-be-encoded CU in an encoded image (a reference frame), and calculating an offset (a motion vector) of the corresponding image block.

An I frame, that is, a reference frame, is also referred to as an intra picture. The I frame is generally a first frame in a video compression technology used by each Group of Pictures (GOP) and Moving Picture Experts Group (MPEG). A I-frame method is an intra-frame compression method, and is also referred to as a "key frame" compression method. For example, the I-frame method is a compression technology based on Discrete Cosine Transform (DCT), and this algorithm is similar to a Joint Photographic Experts Group (JPEG) compression algorithm. During encoding, some video frame sequences are compressed into I frames, some are compressed into P frames, and some are compressed into B frames. During decoding, a complete image may be reconstructed by only using data of the I frame. That is, the I frame may be reconstructed without referring to other video frames, and other video frames may be reconstructed based on the I frame.

(3) Transform & Quantization: A residual video signal is transformed into a transform domain through a transform operation such as discrete Fourier transform (DFT) or discrete cosine transform (DCT), to generate a transform coefficient. A lossy quantization operation is further performed on the signal in the transform domain, which loses a specific amount of information, so that the quantized signal is conducive to compressed expression. In some video coding standards, there may be more than one transform manner for selection. Therefore, a video encoding terminal also needs to select one of the transform manners for a current encoding CU, and inform a video decoding terminal. The fineness of quantization is generally determined by a quantization parameter (QP). If a value of the QP is larger, it indicates that coefficients in a larger value range are quantized into a same output. Therefore, larger distortion and a lower code rate are generally caused. On the contrary, if the value of the QP is smaller, coefficients in a smaller value range are quantized into a same output. Therefore, less distortion and a corresponding higher code rate are generally caused.

(4) Entropy coding or statistical coding: Statistical compression coding is performed on a quantized transform domain signal according to an occurrence frequency of each value, to finally output a binarized (0 or 1) compressed code stream. In addition, other information such as a selected mode and a motion vector is generated through encoding, and entropy coding is also needed to reduce a code rate. The statistical coding is a lossless coding method, to effectively reduce a code rate required to express a same signal. Common statistical coding manners include variable length coding (VLC) or context-based adaptive binary arithmetic coding (CABAC).

(5) Loop filtering: A reconstructed decoded image may be obtained through operations such as inverse quantization, inverse transform, and prediction compensation (reverse operations of the foregoing 2 to 4) on an encoded image. Compared with an original image, some information of the reconstructed decoded image is different from that of the original image due to an impact of quantization, resulting in distortion. Therefore, the reconstructed image needs to be filtered. A degree of distortion generated through quantization can be effectively reduced by using filters such as deblocking, a sample adaptive offset (SAO), or an adaptive loop filter (ALF). Because these filtered reconstructed images are used as a reference for subsequent encoded images to predict future signals, the foregoing filtering operation is also referred to as loop filtering, that is, a filtering operation in an encoding loop.

It can be learned according to the foregoing video encoding process that in the video decoding terminal, after obtaining a compressed code stream, for each CU, a decoder first performs entropy decoding to obtain various mode information and quantized transform coefficients. Each transform coefficient is inversely quantized and inversely transformed to obtain a residual signal. On the other hand, the decoder may obtain a prediction signal corresponding to the CU according to known encoding mode information. After adding the residual signal of the CU and the prediction signal, the decoder may obtain a reconstructed signal of the CU. Finally, an operation of loop filtering needs to be performed on a reconstructed value of the decoded image, to generate a final output signal.

In recent years, with the development of deep learning technologies, in many existing studies, it attempts to replace some modules in a conventional video coding framework with deep learning models, or an end-to-end coding framework is proposed based on deep learning, especially on loop filtering tools. Compared with a conventional filtering tool, the use of a loop filtering tool based on a deep learning technology can significantly improve the coding performance. The main idea of the loop filtering tool based on deep learning is to obtain a mapping relationship between a reconstructed image and the original image through neural network learning, which is generally used for replacing or helping the conventional filtering tool repair an information loss caused by lossy coding and suppress coding noise, thereby improving the quality of the reconstructed frame and the codec performance.

For example, compared with HPM5.0 (without a CNNLF solution), the CNNLF solution used in current AVS3 reference software HPM5.2 saves nearly 7% of code rate, but the high performance also brings high complexity. Even if processing is performed on a graphics processing unit (GPU), the decoding complexity under RA configuration is still as high as 3942%, and the decoding complexity under LDB configuration is still as high as 7938%, which seriously affects the promotion and disclosure of the loop filtering tool based on deep learning in practice. Because the deployment idea of the video decoding terminal in the currently used solution in HPM5.2 is to perform CNNLF processing on only CTUs whose flag are 1 (that is, CNNLF switches are on), the decoding complexity may be directly reduced by reducing a quantity of the CTUs that enable the CNNLF. Currently, in a standard proposal M5129, according to regularity of a hit rate on the CTUs in a RA test, a temporal layer is proposed and level-4 and level-5 temporal layers are off, as shown in Table 1. Table 1 shows a switch status of the CNN loop filter in different temporal frames.

TABLE 1

| Temporal layer | Included frame | Does a CNN loop filter switch on? |
|---|---|---|
| 0 | 0 (I frame) | On |
| 1 | 16 | On |
| 2 | 8 | On |
| 3 | 4, 12 | On |
| 4 | 2, 6, 10, 14 | Off |
| 5 | 1, 3, 5, 7, 9, 11, 13, 15 | Off |

As the temporal layer increases, temporal information in the reference frame is more fully utilized, a quality of blocks through neural network filtering selected by the CTU switch gradually decreases, a quality improvement caused by the neural network filtering gradually decreases, and the decoding complexity is reduced with a less impact on the performance by switching off the temporal layers that do not contribute much to the quality improvement. Compared with a BD-rate and decoding complexity of HPM5.2, as shown in Table 2, Table 2 shows a comparison of the performance of HPM5.2 after the 4 and 5 temporal layers are off.

TABLE 2

| | Random Access | | | |
|---|---|---|---|---|
| | Y | U | V | DecT |
| Channel A 4k | 2.95% | 1.24% | 2.06% | 61% |
| Channel B 1080p | 1.41% | −0.01% | −0.21% | 70% |
| Channel C 720p | 0.09% | 0.54% | 0.09% | 83% |
| Average of channels | 1.49% | 0.59% | 0.65% | 71% |

Figure 2:
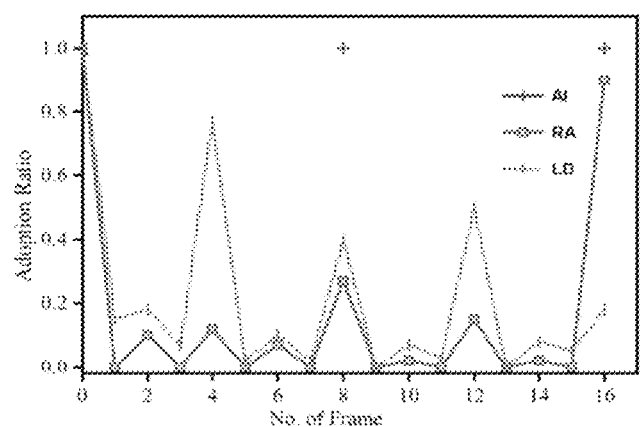
FIG. 2 is a hit rate of a CTU on each video frame under random access (RA) and low delay B frame (LDB) configuration.

Although the method for optimizing the complexity of the standard proposal M5129 reduces the complexity, the performance is significantly reduced, especially on a 4K sequence. FIG. 2 shows a hit rate of a CTU on each video frame under RA and LDB configuration. It can be learned that temporal layer regularity under the LDB configuration is slightly different from that under the RA configuration. Therefore, a policy in Table 1 is not fully applicable to an LDB test.

Figure 3:
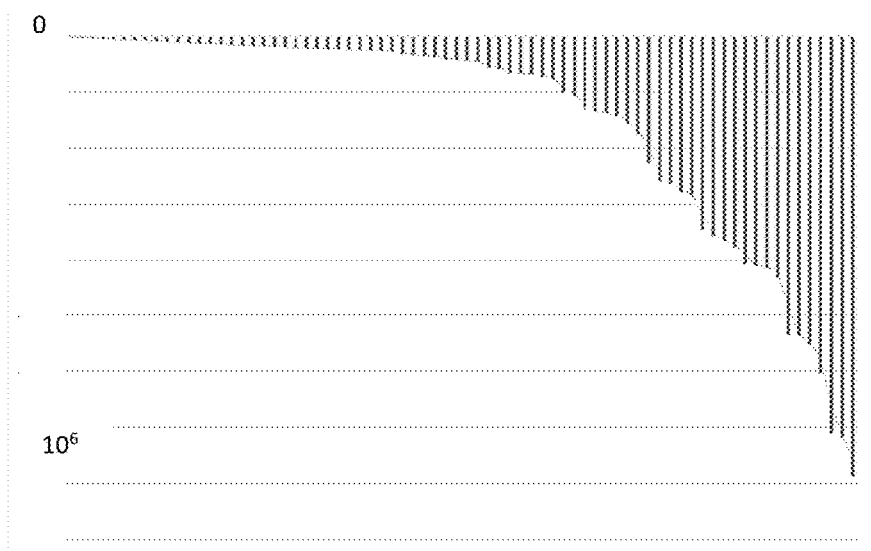
FIG. 3 shows an example distribution status of gains of CTUs with a performance improvement after convolutional neural network loop filter (CNNLF) processing.

In AVS3 reference software HPM5.2, whether a CNNLF brings a performance gain to a current CTU is determined through CTU-level RDO. If there is the gain, a CNNLF tool of the CTU is on, that is, CNNLF processing is performed on pixels in the CTU; otherwise the CNNLF tool of the CTU is off, that is, CNNLF processing is not performed on the pixels in the CTU. The inventors of this disclosure collect statistics on a distribution status of gains of CTUs with a performance improvement after CNNLF processing in a second frame of a RitualDance sequence, and a statistical result is shown in FIG. 3. The gain herein is measured by using a Euclidean distance, and a calculation method for the gain is as follows:

$$Dist_i = (I_{i,REC} - I_{i,org})^2 - (I_{i,CNN} - I_{i,org})^2$$

i representing a CTU serial number, $I_{CNN}$ being an image corresponding to an $i^{th}$ CTU in a video frame after CNNLF processing, $I_{i,REC}$ being a decoded image corresponding to an $i^{th}$ CTU in a video frame that is not processed by the CNNLF, and $I_{i,org}$ being an image corresponding to an $i^{th}$ CTU in an original video frame on which compression coding is not performed. If $Dist_i$ is a positive number, it indicates that there is a gain on the $i^{th}$ CTU after CNNLF processing, and a larger $Dist_i$ indicates a larger gain. If $Dist_i$ is a negative number, it indicates that there is a loss on the $i^{th}$ CTU after CNNLF processing, and a smaller $Dist_i$ indicates a greater loss. It is found from FIG. 3 that in a same video frame, a distribution of gains on different CTUs is uneven, and gains on a large part of the CTUs are not obvious. Because a time of CNNLF processing on each CTU is the same, by using excessive computing resources for CTUs with no obvious gains, the decoding complexity is greatly increased, and the filtered image quality cannot be greatly improved.

Based on this, an embodiment of this disclosure provides a video encoding method. In the video encoding method, after completing encoding of a video frame, a video encoding terminal obtains a reconstructed video frame from encoded data of an encoded video frame, the encoded video frame including at least two encoding blocks. The video encoding terminal filters the reconstructed video frame, to obtain gains obtained by filtering blocks in the reconstructed video frame, and determines, according to a distribution of the gains of the filtered blocks from the at least two encoding blocks, an encoding block that needs to be filtered when a video decoding terminal decodes the encoded video frame. The video encoding terminal transmits the encoded data of the encoded video frame to the video decoding terminal, the encoded data of the encoded video frame including indication information of an encoding block that needs to be filtered. In this way, when decoding the encoded video frame, the video decoding terminal may filter, according to the indication information in the encoded data of the encoded video frame, only the encoding block that needs to be filtered in the encoded video frame. In a case that the video quality is hardly affected or the video quality is not obviously degraded, the decoding complexity is reduced, and the filtering efficiency is improved. The video frame may be divided into at least two blocks, and the block in this embodiment of this disclosure may be a CTU, a smaller region (for example, a CU) defined than that of a CTU, or a region that may include at least two CTUs, a region obtained by using another division method on inside of a frame, or the like. In the foregoing video encoding method, the video encoding terminal may obtain an encoding block with a larger gain through screening after expected filtering in the encoded video frame according to the distribution of gains of the blocks in the filtered video frame, and during decoding, the video decoding terminal filters only an encoding block with a larger gain after expected filtering, and does not filter an encoding block with a smaller gain after expected filtering. Although a total gain of a specific frame may be reduced in this method, in inter-frame prediction, the filtering effect of the filtering tool on a next frame can be improved. Finally, in a case that the video quality is hardly affected or the video quality is not obviously degraded, the decoding complexity is reduced, and the filtering efficiency is improved.

The video encoding method in the embodiments of this disclosure does not involve a filtering model used during encoding/decoding. Therefore, the video encoding method in the embodiments of this disclosure is applicable to any filtering model, and is applicable to a video codecs or a post-processing product for video compression in which the filtering model based on deep learning is used.

After a design idea of the embodiments of this disclosure is described, the following briefly describes disclosure scenarios to which the technical solutions in this embodiment of this disclosure are applicable. The application scenarios described below are only used for describing rather than limiting the embodiments of this disclosure. During specific implementation, the technical solutions provided in the embodiments of this disclosure are flexibly applicable according to an actual requirement.

Figure 4:
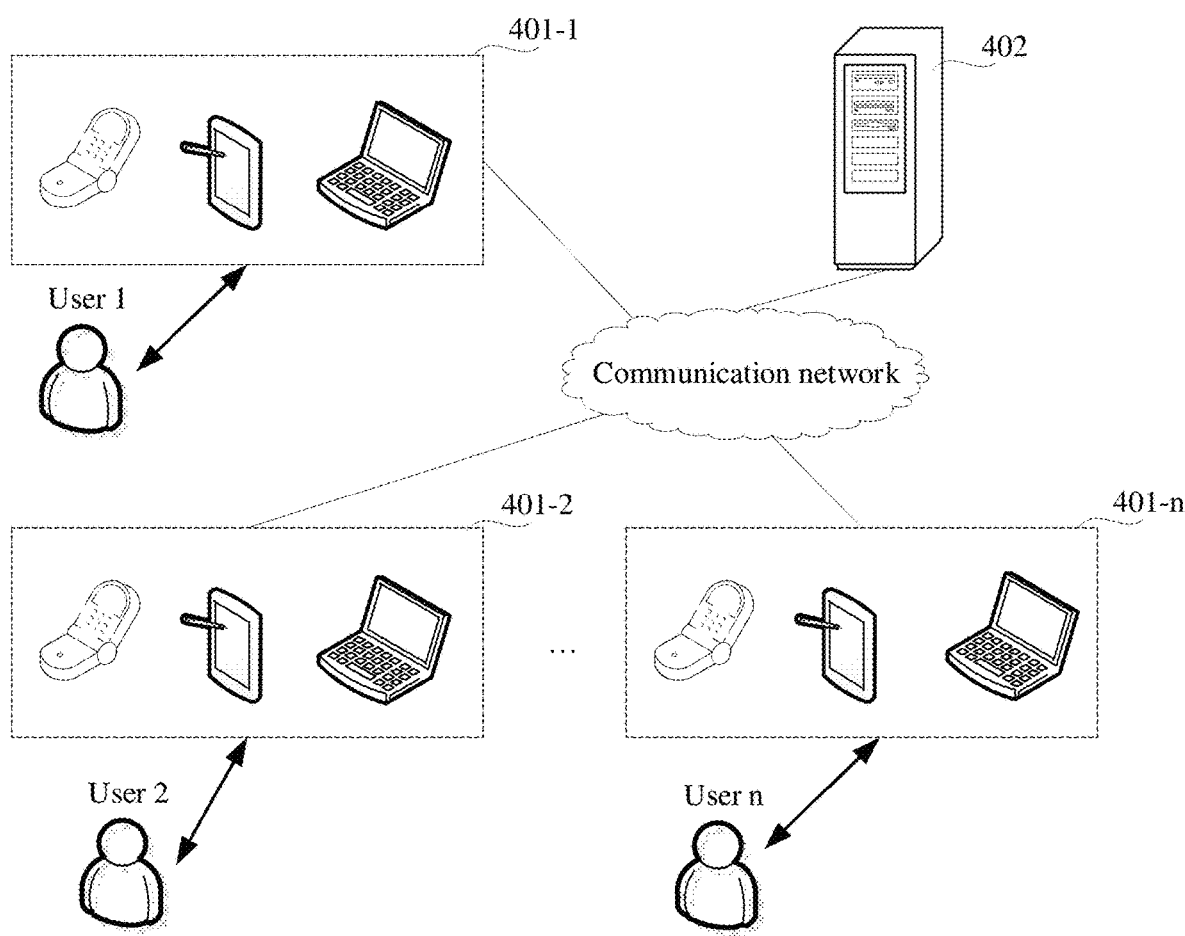
FIG. 4 is a schematic diagram of an example application scenario of a video encoding method and a video decoding method according to an embodiment of this disclosure.

FIG. 4 is a schematic diagram of an application scenario of a video encoding method and a video decoding method according to an embodiment of this disclosure. The application scenario includes terminal devices 401 (including a terminal device 401-1, a terminal device 401-2, . . . and a terminal device 401-n) and a server 402. The terminal device 401 and the server 402 may be connected through a wireless communication network or a wired communication network. The terminal device 401 includes, but is not limited to, electronic devices such as a desktop computer, a mobile phone, a mobile computer, a tablet computer, a media player, a smart wearable device, a smart TV, an in-vehicle device, and a personal digital assistant (PDA). The server 402 may be an individual physical server, or may be a server cluster including a plurality of physical servers or a distributed system, or may be a cloud server for providing basic cloud services such as a cloud computing, a cloud database, cloud computing, a cloud function, cloud storage, a network service, cloud communication, a middleware service, a domain name service, a security service, a content delivery network (CDN), and a big data and artificial intelligence platform.

When intending to watch a specific video, a user of the terminal device 401 may send a video obtaining or retrieving request to the server 402 through the terminal device 401. The server 402 searches for a corresponding video based on the video obtaining request, encodes the video to obtain an encoded video stream, and transmits the video stream to the terminal device 401. The terminal device 401 decodes and filters the received video stream, to play the video on the terminal device 401. In this case, the server 402 is equivalent to video encoding terminal, and the terminal device 401 is equivalent to the video decoding terminal.

When a user of the terminal device 401-1 intends to push a video to another user (for example, the terminal device 401-2) through the server 402, the terminal device 401-1 encodes the video to obtain an encoded video stream, and transmits the video stream to the server 402, and the server 402 then forwards the video stream to the terminal device 401-2. The terminal device 401-2 decodes and filters the received video stream, to play the video on the terminal device 401-2. In this case, the terminal device 401-1 is equivalent to video encoding terminal, and the terminal device 401-2 is equivalent to the video decoding terminal.

Certainly, the video encoding method and the video decoding method provided in the embodiments of this disclosure is not limited to the application scenario shown in FIG. 4, and is further applicable to other possible application scenarios, which is not limited in this embodiment of this disclosure. Functions that can be implemented by devices in the application scenario shown in FIG. 4 are described in the following method embodiments together. Details are not described herein.

To further describe the technical solution provided in the embodiments of this disclosure, the technical solution is described in detail below with reference to the accompanying drawings and specific implementations. Although the embodiments of this disclosure provide method operational steps shown in the following embodiments or accompanying drawings, more or fewer operational steps may be included in the methods based on conventional efforts or without creative efforts. In the steps in which no necessary causal relationship logically exists, the execution order of the steps is not limited to the execution orders provided in the embodiments of this disclosure.

The technical solution provided in this embodiment of this disclosure is described below with reference to the application scenario shown in FIG. 4. Any video encoding method provided in the embodiments of this disclosure is applicable to any video encoding terminal, for example, the terminal device or the server shown in FIG. 4. Any video decoding method provided in the embodiments of this disclosure is applicable to any video decoding terminal, for example, the terminal device shown in FIG. 4.

Figure 5:
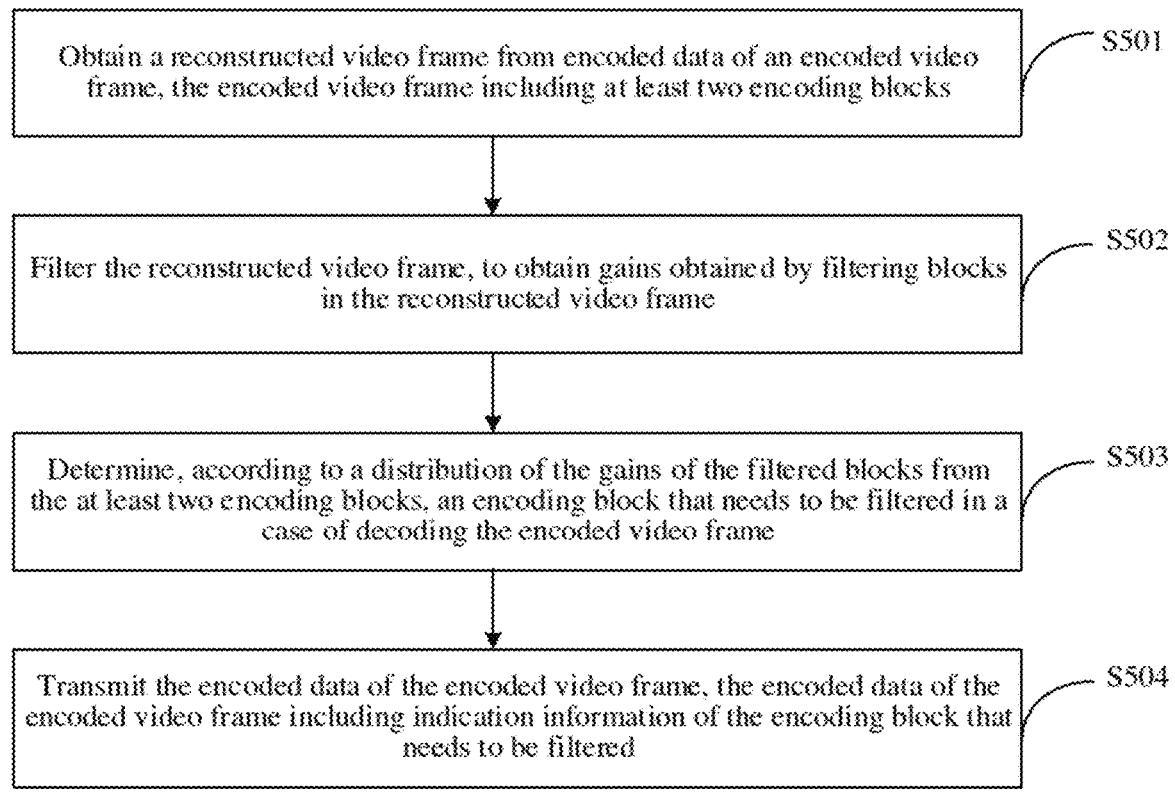
FIG. 5 is a schematic flowchart of an example video encoding method according to an embodiment of this disclosure.

Referring to FIG. 5, an embodiment of this disclosure provides a video encoding method, which includes the following steps:

S501. Obtain a reconstructed video frame from encoded data of an encoded video frame, the encoded video frame including at least two encoding blocks.

According to this embodiment of this disclosure, the video encoding terminal may obtain a reconstructed video frame from encoded data of an encoded video frame. The block may be a CTU in a video frame, or may be a smaller region (for example, a CU) defined than that of a CTU, or a region that may include at least two CTUs, or a region obtained by dividing inside of a video frame by using another block division method, which is not limited in this embodiment of this disclosure.

During specific implementation, the process of obtaining a reconstructed video frame from encoded data of an encoded video frame may include, for example, operations of inverse quantization, inverse transform, and prediction compensation on the encoded data, and details are not described again.

S502. Filter the reconstructed video frame, to obtain gains obtained by filtering blocks in the reconstructed video frame, the filtered blocks being corresponding to the at least two encoding blocks.

The filtering method used by the video encoding terminal in step S502 may be the same as the filtering method used by the video decoding terminal. The filtering method used by the video decoding terminal is not limited in this embodiment of this disclosure, a CNNLF model may be used for filtering, or other filtering models may be used.

During specific implementation, first, the video encoding terminal encodes an original video to obtain encoded data, and then obtains a reconstructed video frame from encoded data of each encoded video frame. Next, the video encoding terminal filters each reconstructed video frame to obtain a filtered image (a filtered video frame) corresponding to each reconstructed video frame. Then, the video encoding terminal obtains, based on a specific evaluation standard, gains obtained by filtering blocks in the reconstructed video frame (blocks in the filtered video frame). For example, the video encoding terminal may perform similarity evaluation on the original video frame, a decoded video frame (that is, the reconstructed video frame), and the filtered video frame, to obtain gains obtained by filtering blocks in the reconstructed video frame. A larger gain of the block indicates a more obvious improvement effect of filtering on the image quality of the block. On the contrary, a smaller gain of the block indicates a less obvious improvement effect of filtering on the image quality of the block.

According to this embodiment of this disclosure, the video encoding terminal may obtain a gain obtained by filtering each block in the reconstructed video frame in the following manners. For example, for each block in the reconstructed video frame, the video encoding terminal may obtain a gain obtained by filtering the block based on a first similarity between an original image corresponding to the block and a reconstructed image corresponding to the block, and a second similarity between the original image corresponding to the block and a filtered image corresponding to the block. The original image corresponding to the block is an image corresponding to the block in a video frame before encoding. The reconstructed image corresponding to the block is an image corresponding to the block in the reconstructed video frame. The filtered image corresponding to the block is an image obtained by filtering the block in the reconstructed video frame. The evaluation standard used for calculating the first similarity and the second similarity may be a Euclidean distance, a mean square error (MSE), or a structural similarity index (SSIM), or the like, which is not limited in this embodiment of this disclosure. During specific implementation, for example, a gain obtained by filtering each block in the reconstructed video frame may be calculated by using the following Formula 1:

$$\text{Dist}_i = S(I_{i,REC}, I_{i,org}) - S(I_{i,CNN}, I_{i,org}) \quad \text{(Formula 1)},$$

i representing a sequence number of the block in the reconstructed video frame, $I_{i,org}$ being an original image corresponding to an $i^{th}$ block, $I_{i,REC}$ being a reconstructed image corresponding to the $i^{th}$ block, $I_{i,CNN}$ being a filtered image corresponding to the $i^{th}$ block, $S(I_{i,REC}, I_{i,org})$ representing a similarity between $I_{i,REC}$ and $I_{i,org}$, $S(I_{i,CNN}, I_{i,org})$ representing a similarity between $I_{i,CNN}$ and $I_{i,org}$, and $\text{Dist}_i$, being a gain obtained by filtering the $i^{th}$ block in the reconstructed video frame (or referred to as a gain of the $i^{th}$ block). If $\text{Dist}_i$ is a positive number, it indicates that there is a gain on the $i^{th}$ block after filtering. In this case, a larger $\text{Dist}_i$ indicates a larger gain; and If $\text{Dist}_i$ is a negative number, it indicates that there is a loss on the $i^{th}$ block after filtering. In this case, a smaller $\text{Dist}_i$ indicates a greater loss.

In an actual application, the first similarity and the second similarity may be calculated based on pixel parameters of pixels in the block, where the pixel parameters may be at least one of the following: a Y component, a U component, and a V component, and the pixel parameter may also be a grayscale value, an RGB value, or the like.

S503. Determine, according to a distribution of the gains of the filtered blocks from the at least two encoding blocks, an encoding block that needs to be filtered in a case of decoding the encoded video frame. The term "gain" represents a loop filtering gain. The terms "gain" and "filtering gain" are used interchangeably.

During specific implementation, the video encoding terminal may determine, in the following manners, an encoding block that needs to be filtered in each encoded video frame. For example, the video encoding terminal determines a gain threshold according to a distribution of the gains obtained by filtering the blocks in the reconstructed video frame; and determines, in the filtered blocks, an encoding block corresponding to a block whose gain is greater than the gain threshold as the encoding block that needs to be filtered in a case of decoding the encoded video frame. In this way, the video encoding terminal may determine an appropriate gain threshold based on the distribution of the gains of the filtered blocks in the reconstructed video frame, and obtain a block with a larger gain through screening based on the gain threshold, to inform the video decoding terminal of filtering an encoding block corresponding to the obtained block with the larger gain through screening during decoding, that is, an encoding block with a larger gain after expected filtering, and not filtering an encoding block corresponding to an obtained block with a smaller gain through screening, that is, an encoding block with a smaller gain after expected filtering, so that computing resources are used for the block that is more helpful for improving the image quality, thereby reducing the decoding complexity and improving the filtering efficiency.

S504. Transmit the encoded data of the encoded video frame, the encoded data of the encoded video frame including indication information of an encoding block that needs to be filtered.

During specific implementation, for example, when the video encoding terminal sends the encoded data of the encoded video frame to the video decoding terminal, encoded data of each encoded video frame carries indication information. The indication information is used for indicating the video decoding terminal which encoding block in the encoded video frame needs to be filtered, for example, for CNNLF processing. For example, the indication information may include a flag identifier corresponding to each encoding block in the encoded video frame. When a flag of the encoding block is 1, it indicates that the video decoding terminal needs to filter the encoding block when decoding the encoding block. When the flag of the encoding block is 0, it indicates that the video decoding terminal does not need to filter the encoding block when decoding the encoding block. In another example, the indication information may include a sequence number of the encoding block that needs to be filtered in the encoded video frame. For example, if the indication information includes sequence numbers 1, 4, and 5, it indicates that the video decoding terminal needs to filter first, fourth, and fifth encoding blocks in the encoded video frame. In some other implementations, the filtering indication for the video blocks may include a bit-map.

During specific implementation, the video encoding terminal writes the indication information into the encoded data of the encoded video frame, and sends the indication information to the video decoding terminal. The video decoding terminal obtains the reconstructed video frame from the encoded data of the encoded video frame, filters, based on the indication information in the encoded data of the encoded video frame, the encoding block that needs to be filtered in the reconstructed video frame, and obtains and plays a filtered video frame.

In the video encoding method in the embodiments of this disclosure, after completing encoding of a video frame, a video encoding terminal obtains a reconstructed video frame from encoded data of the encoded video frame, filters the reconstructed video frame, to obtain gains brought by filtering blocks in the filtered video frame, and obtains an encoding block with a larger gain through screening after expected filtering according to a distribution of the gains of the blocks, so that a video decoding terminal only filters the encoding block with the larger gain after expected filtering during decoding, and does not filter an encoding block with a smaller gain after expected filtering. On the premise of increasing the gains of the filtered video frame as much as possible, a quantity of encoding blocks participating in filtering is reduced. In a case that the video quality is hardly affected or the video quality is not obviously degraded, the decoding complexity is reduced, and the filtering efficiency is improved.

Figure 6:
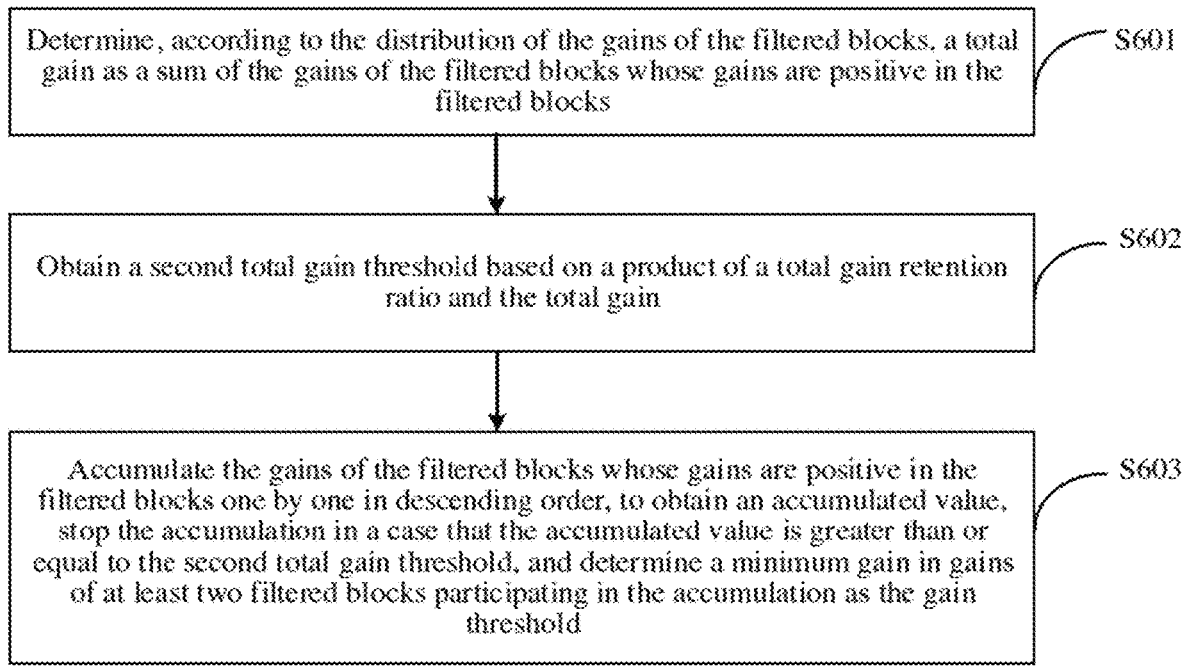
FIG. 6 is a schematic flowchart of an example implementation for determining a gain threshold according to an embodiment of this disclosure.

During specific implementation, referring to FIG. 6, a gain threshold corresponding to any video frame may be determined in any one of the following manners.

S601. Determine, according to the distribution of the gains of the filtered blocks, a total gain as a sum of the gains of the filtered blocks whose gains are positive in the filtered blocks. In step S601, the video encoding terminal determines, according to the distribution of the gains of the filtered blocks in the reconstructed video frame, a total gain of the reconstructed video frame as a sum of the gains of the filtered blocks whose gains are positive in the filtered blocks. The filtered blocks in step S601 are blocks in the same video frame.

S602. Obtain a second total gain threshold based on a product of a total gain retention ratio and the total gain.

During specific implementation, the total gain of the filtered video frame may be represented by using the following Formula: $\Sigma_{i=1}^{N} Dist_i$. If N is a quantity of blocks whose gains are positive in the filtered video frame, the second total gain threshold is $G \Sigma_{i=1}^{N} Dist_i$, where G is a total gain retention ratio of the filtered video frame.

During specific implementation, a total gain retention ratio may be preset, and each filtered video frame may correspond to a same total gain retention ratio.

During specific implementation, the video encoding terminal may further determine a total gain retention ratio of each filtered video frame according to a distribution of gains of blocks in each filtered video frame. In this way, the total gain retention ratio corresponding to each filtered video frame is different, and by using the distribution of the gains of each filtered video frame, the total gain retention ratio of each filtered video frame is dynamically determined, to improve the accuracy of block screening. Specifically, the total gain retention ratio of the filtered video frame may be determined in any one of the following manners:

First manner: determining the total gain retention ratio based on a ratio of a quantity of the filtered blocks whose gains are positive in the filtered blocks to a total quantity of the blocks in the filtered video frame.

During specific implementation, the video encoding terminal may collect, according to the gains of the filtered blocks in the filtered video frame, statistics on a quantity N of blocks whose gains are positive in the filtered blocks, and determine a hit rate of the filtered video frame r=N/block_num, where block_num is a total quantity of blocks included in the filtered video frame; and then determine a total gain retention ratio G of the filtered video frame based on the hit rate r.

In an actual application, a relationship between r and G may be represented by using the following piecewise or stepwise function:

$$G = \begin{cases} g_1, r \in [a_0, a_1] \\ g_2, r \in [a_1, a_2] \\ \vdots \\ g_n, r \in [a_{n-1}, a_n] \end{cases},$$

values of a segmental value n, a range $a_n$, and a corresponding $g_n$ being all selected according to experience, and $0 \le a_n, g_n \le 1$.

Further, it can be defined $a_0 < a_1 < a_2 < \ldots < a_{n-1} < a_n$ and $g_1 < g_2 < \ldots < g_n$. That is, a higher hit rate r indicates a larger total gain retention ratio G.

During a specific implementation, the total gain retention ratio may be positively correlated with the ratio. For example, the relationship between r and G may also be: G=k×r+b, where values of k and b may be selected according to experience.

Second manner: determining the total gain retention ratio based on a gain statistical feature value of the filtered blocks whose gains are positive in the filtered blocks.

During specific implementation, the gain statistical feature value includes, but is not limited to, an average value, a median, and a standard deviation.

During specific implementation, a relationship between the gain statistical feature value and the total gain retention ratio may be represented by using a piecewise function. The standard deviation is used as an example. A relationship between the standard deviation std and the total gain retention ratio G may be represented by using the following piecewise function:

$$G = \begin{cases} g_1, std \in [a_0, a_1] \\ g_2, std \in [a_1, a_2] \\ \vdots \\ g_n, std \in [a_{n-1}, a_n] \end{cases},$$

values of a segmental value n, a range $a_n$, and a corresponding $g_n$ being all selected according to experience, and $0 < a_n, g_n < 1$.

Further, it can be defined $a_0 < a_1 < a_2 < \ldots < a_{n-1} < a_m$ and $g_1 < g_2 < \ldots < g_n$. That is, a higher standard deviation std indicates a larger total gain retention ratio G.

During specific implementation, the total gain retention ratio may be positively correlated with the gain statistical feature value. For example, the relationship between the gain statistical feature value P and G may also be: G=k×P+b, where values of k and b may be selected according to experience.

S603. Accumulate the gains of the filtered blocks whose gains are positive in the filtered blocks one by one in descending order, to obtain an accumulated value, stop the accumulation in a case that the accumulated value is greater than or equal to the second total gain threshold, and determine a minimum gain in gains of at least two filtered blocks participating in the accumulation as the gain threshold.

In an actual application, the video encoding terminal may determine an initial value of a flag corresponding to each filtered block according to the gains of the blocks in the filtered video frame, set flags of filtered blocks whose gains are positive to 1, and set flags of filtered blocks whose gains are less than or equal to 0 to 0; and then, set $$\begin{cases} Dist_i = Dist_i, \text{ if } flag_i = 1 \\ Dist_i = 0, \text{ if } flag_i = 0 \end{cases},$$

where $flag_i$ represents a flag of an $i^{th}$ block in the filtered video frame. In this case, a formula for calculating the hit rate may be expressed as: $r=(\Sigma_{i=1}flag_i)/block\_num$ and block_num is a total quantity of blocks included in the filtered video frame.

Then, the video encoding terminal determines a total gain retention ratio G according to the distribution of the gains of the filtered blocks, and obtains a second total gain threshold $G \Sigma_{i=1}^{N}Dist_i$ based on a product of the total gain retention ratio G and the total gain $\Sigma_{i=1}^{N}Dist_i$.

Next, the video encoding terminal sorts the gains of the filtered blocks whose gains are positive in descending order to obtain a sequence of $Dist'_j$ (j=1, . . . , N). In the sequence, a higher ranking of the filtered block indicates a larger gain. That is, a smaller j indicates a larger $Dist'_j$. Then, according to rankings of $Dist'_j$, the gains $Dist'_j$ of the filtered blocks are accumulated from j=1 until $\Sigma_{j=1}^{T}Dist'_j \geq G \Sigma_{i=1}^{N}Dist_i(T \leq N)$, and the accumulation stops. In this case, a gain threshold $D_1=Dist'_j$ may be determined.

Finally, the video encoding terminal sets, in the filtered video frame, a flag of an encoding block corresponding to a block whose gain is not less than the gain threshold $D_1$ to 1, sets a flag of an encoding block corresponding to a block whose gain is less than the gain threshold $D_1$ to 0, writes set flags of the encoding blocks as indication information into the encoded data of the encoded video frame, and sends the flags of the encoding blocks to the video decoding terminal.

After receiving the encoded data of the encoded video frame, the video decoding terminal filters the encoding block with flag=1 according to the flags of the encoding blocks in the indication information, and does not filter the encoding block with flag=0.

In the implementation shown in FIG. 6, based on the distribution of the gains of the filtered block, an appropriate proportion of encoding blocks are reserved for filtering. In this way, on the premise of increasing, as much as possible, the total gain obtained by using the decoded video frame, a proportion of blocks involved in filtering in the video frame is reduced, and further in a case that the video quality is hardly affected or the video quality is not obviously degraded, the decoding complexity is reduced, and the filtering efficiency is improved.

Further, before step S603, the method in the embodiments of this disclosure further includes the following steps: determining, based on a rate-distortion optimization algorithm and in a case that gains obtained by filtering the reconstructed video frame reach the second total gain threshold, to instruct to filter the encoded video frame in the encoded data of the encoded video frame during decoding. Through the foregoing steps, based on the second total gain threshold, whether the encoded video frame needs to be filtered may be further determined when the video decoding terminal decodes the encoded video frame, and for the encoded video frame that needs to be filtered, an encoding block that needs to be filtered continues to be obtained through screening in the encoded video frame.

Figure 7:
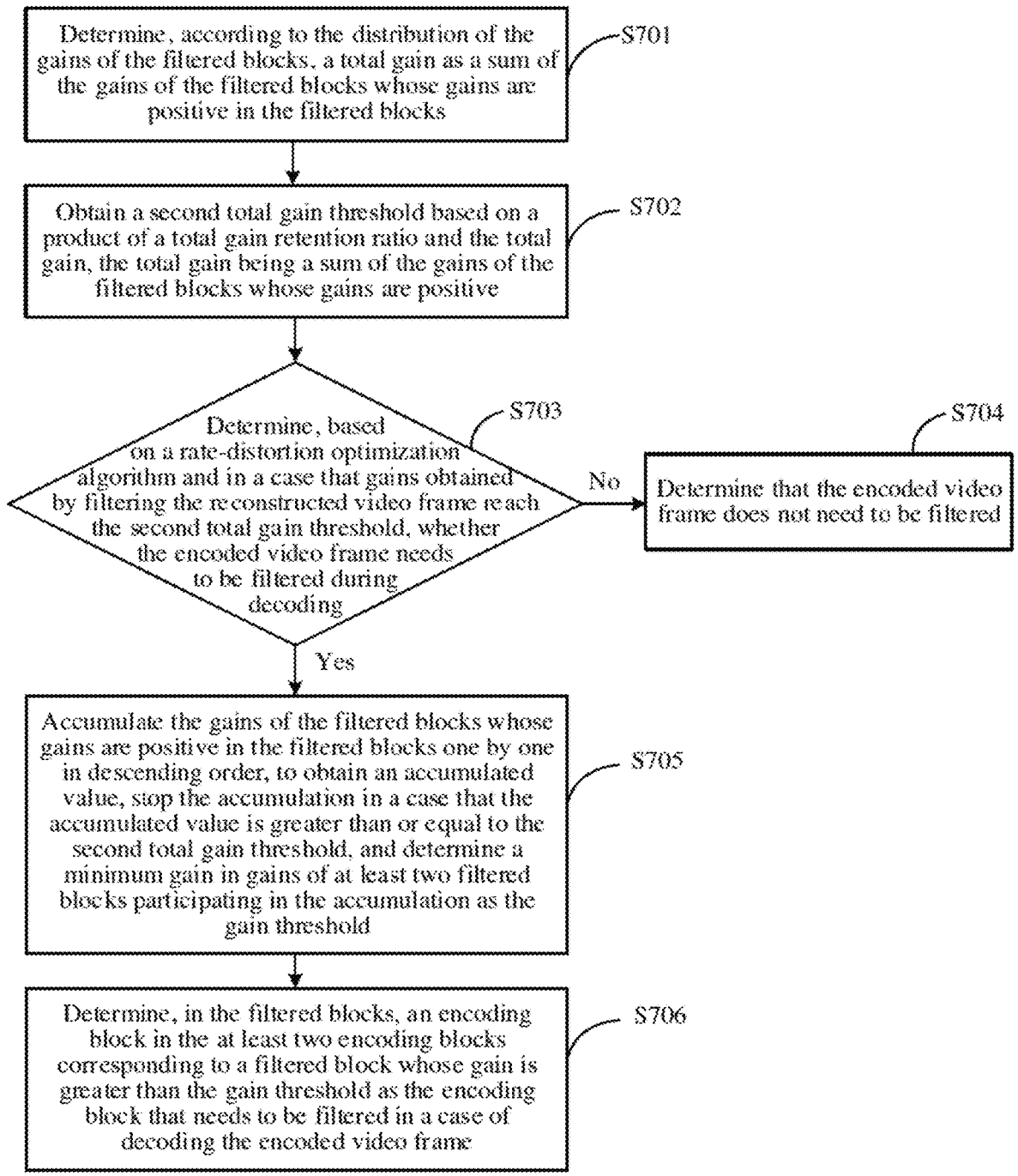
FIG. 7 is a schematic flowchart of an example implementation for determining a block that needs to be filtered according to an embodiment of this disclosure.

Specifically, referring to FIG. 7, an encoding block that needs to be filtered in the encoded video frame may be determined in the following manners:

S701. Determine, according to the distribution of the gains of the filtered blocks, a total gain as a sum of the gains of the filtered blocks whose gains are positive in the filtered blocks. In step S701, the video encoding terminal determines, according to the distribution of the gains of the filtered blocks in the reconstructed video frame, a total gain of the filtered video frame as a sum of the gains of the filtered blocks whose gains are positive in the filtered blocks.

S702. Obtain a second total gain threshold based on a product of a total gain retention ratio and the total gain, the total gain being a sum of the gains of the filtered blocks whose gains are positive.

For specific implementations of step S701 and step S702, refer to step S601 and step S602, and details are not described again.

S703. Determine, based on the rate-distortion optimization algorithm and in a case that gains obtained by filtering the reconstructed video frame reach the second total gain threshold, whether the encoded video frame needs to be filtered during decoding, and perform step S705 if yes; otherwise, perform step S704.

Rate-distortion optimization (RDO) is a method for improving the video compression video quality, and this name refers to optimizing an amount of distortion (a video quality loss) for an amount of data (a rate) required for video coding. The RDO can improve the quality of video coding and also reduce the amount of data in the encoded video, that is, balance a video size and the video quality to make an optimal encoding decision. By using the codec or the existing rate-distortion optimization algorithm in a codec standard, whether to instruct the video decoding terminal to filter the encoded video frame is determined when decoding the encoded video frame. According to this embodiment of this disclosure, the video encoding terminal determines, based on the gains brought by filtering the reconstructed video frame, and the amount of data added when the indication information is assumed to be written into the encoded data of the encoded video frame, whether it is worth instructing to filter the encoded video frame in the encoded data of the encoded video frame. In step S703, to make a total gain obtained by using the filtered video frame reach the second total gain threshold, the video encoding terminal determines that an amount of data of the indication information needs to be added to the encoded data, and determines, based on the rate-distortion optimization algorithm and according to the added amount of data and the total gain obtained by using the filtered video frame, whether it is worth instructing to filter the encoded video frame in the encoded data of the encoded video frame. In an actual application, the video encoding terminal may determine, in a case that the total gain of the filtered video frame reaches the second total gain threshold, a quantity of the encoding blocks that need to be filtered, and further determine an amount of data of the indication information that needs to be added to the encoded data. For example, indication information of each encoding block needs to occupy an amount of data of m bits. If there are T encoding blocks that need to be filtered, an amount of data of (T×m) bits is added.

S704. Determine that the encoded video frame does not need to be filtered.

During specific implementation, if determining that the video decoding terminal does not need to filter the encoded video frame, the video encoding terminal sets a frame-level switch frame_flag corresponding to the encoded video frame to 0, and writes information about the frame-level switch as indication information into the encoded data of the encoded video frame. When the frame-level switch frame_flag corresponding to the encoded video frame is 0, the video decoding terminal does not filter the encoded video frame.

S705. Accumulate the gains of the filtered blocks whose gains are positive in the filtered blocks one by one in descending order, to obtain an accumulated value, stop the accumulation in a case that the accumulated value is greater than or equal to the second total gain threshold, and determine a minimum gain in gains of at least two filtered blocks participating in the accumulation as the gain threshold.

For the specific implementation of step S705, refer to the specific implementation in step S603, and details are not described again.

S706. Determine, in the filtered blocks, an encoding block in the at least two encoding blocks corresponding to a filtered block whose gain is greater than the gain threshold as the encoding block that needs to be filtered in a case of decoding the encoded video frame.

Figure 8:
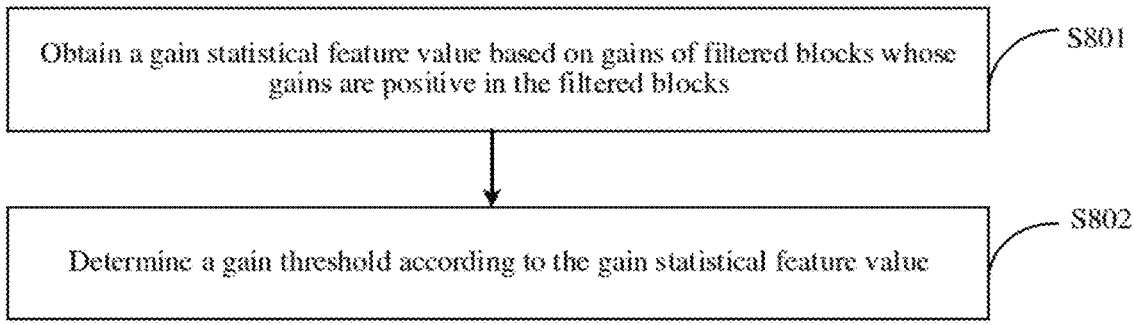
FIG. 8 is a schematic flowchart of another example implementation for determining a gain threshold according to an embodiment of this disclosure.

During specific implementation, referring to FIG. 8, a gain threshold corresponding to any video frame may be determined in any one of the following manners.

S801. Obtain a gain statistical feature value based on gains of filtered blocks whose gains are positive in the filtered blocks.

S802. Determine a gain threshold according to the gain statistical feature value.

During specific implementation, the gain statistical feature value includes, but is not limited to, an average value, a median, and a standard deviation.

The average value is used as an example. An initial value of a flag corresponding to each filtered block may be determined according to the gains of the filtered blocks, flags of filtered blocks whose gains are positive are set to 1, and flags of filtered blocks whose gains are less than or equal to 0 are set to 0; and then, $$\begin{cases} Dist_i = Dist_i, \text{ if } flag_i = 1 \\ Dist_i = 0, \text{ if } flag_i = 0 \end{cases}$$

is set, where $flag_i$ is a flag of an $i^{th}$ block in the filtered video frame. In this case, a gain threshold $D_2 = a \times Dist$ may be set for an average value $Dist = (\Sigma_{i=1}^{N} Dist_i)/(\Sigma_{i=1}^{N} flag_i)$ of gains of the blocks whose gains are positive, and a is a coefficient set according to experience.

Certainly, a correspondence between the gain statistical feature value and the gain threshold may alternatively be determined in a manner of a piecewise function. For details, refer to the piecewise functions described in the first manner and the second manner, and details are not described again.

For a specific implementation of determining the gain threshold based on another gain statistical feature value, refer to the processing manner of the average value, and details are not described again.

Further, before the determining, in the filtered blocks, an encoding block in the at least two encoding blocks corresponding to a filtered block whose gain is greater than the gain threshold as the encoding block that needs to be filtered in a case of decoding the encoded video frame, the method in the embodiments of this disclosure further includes the following steps: determining, based on a rate-distortion optimization algorithm and in a case that gains obtained by filtering the reconstructed video frame reach a first total gain threshold, to instruct to filter the encoded video frame in the encoded data of the encoded video frame during decoding, the first total gain threshold being a sum of the gains of the filtered blocks whose gains are greater than the gain threshold determined in step S802 in the filtered blocks.

Figure 9:
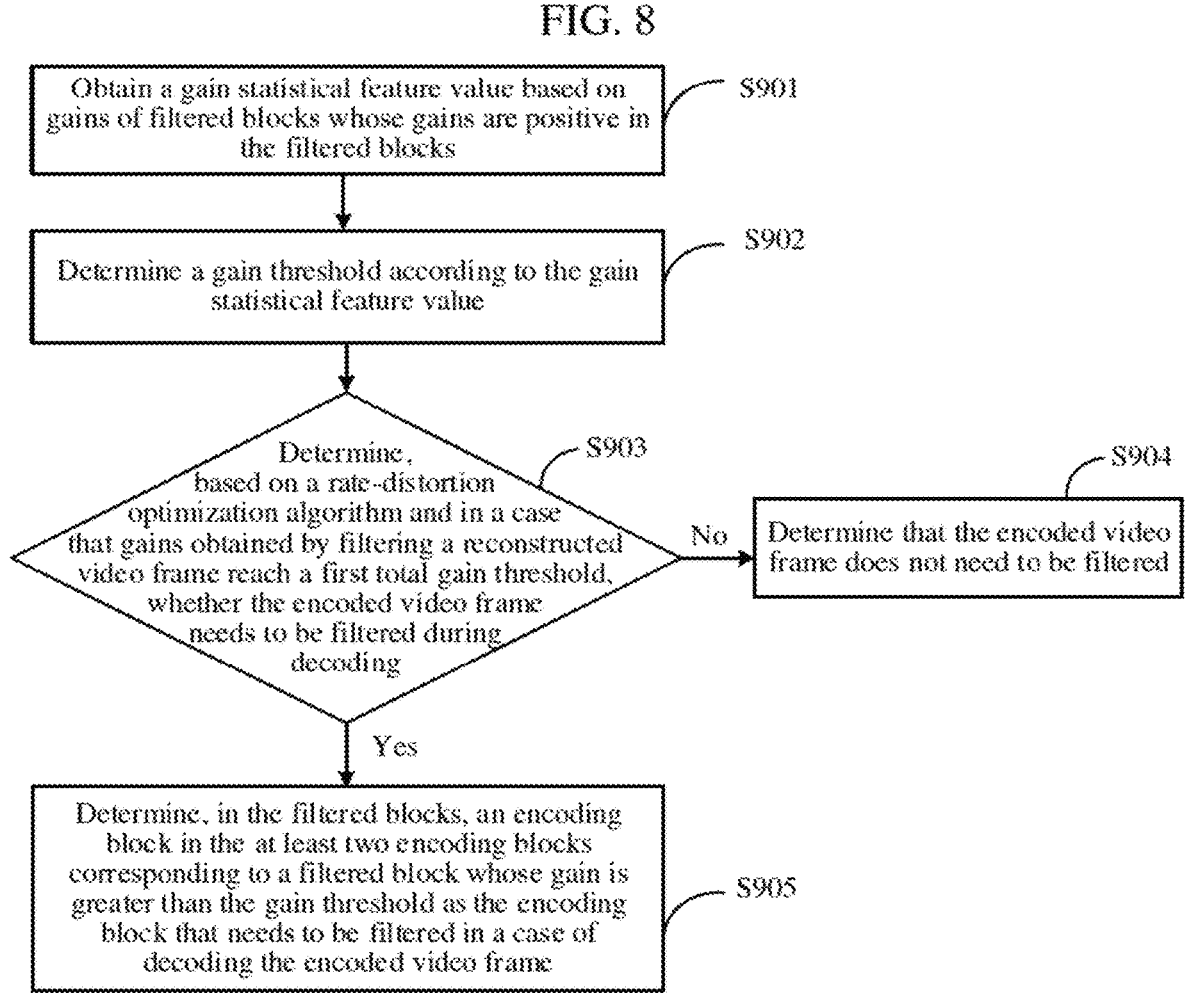
FIG. 9 is a schematic flowchart of another example implementation for determining a block that needs to be filtered according to an embodiment of this disclosure.

Specifically, referring to FIG. 9, an encoding block that needs to be filtered in the encoded video frame may be determined in the following manners:

S901. Obtain a gain statistical feature value based on gains of filtered blocks whose gains are positive in the filtered blocks.

S902. Determine a gain threshold according to the gain statistical feature value.

For specific implementations of step S901 and step S902, refer to step S801 and step S802, and details are not described again.

S903. Determine, based on a rate-distortion optimization algorithm and in a case that gains obtained by filtering a reconstructed video frame reach a first total gain threshold, whether the encoded video frame needs to be filtered during decoding, and perform step S905 if yes; otherwise, perform step S904.

The first total gain threshold is a sum of the gains of the filtered blocks whose gains are greater than the gain threshold determined in step S902. In step S903, to make a total gain obtained by using the filtered video frame reach the first total gain threshold, the video encoding terminal may first determine that an amount of data of the indication information of the encoding blocks that need to be filtered needs to be added to the encoded data, and then determines, based on the rate-distortion optimization algorithm and according to the added amount of data and the total gain obtained by using the video frame, whether it is worth filtering the encoded video frame. In an actual application, the video encoding terminal may determine, in a case that the total gain of the filtered video frame reaches the first total gain threshold, a quantity of the encoding blocks that need to be filtered, and further determine an amount of data of the indication information that needs to be added to the encoded data. For example, indication information of each encoding block needs to occupy an amount of data of m bits. If there are T encoding blocks that need to be filtered, an amount of data of indication information of (T×m) bits is added.

S904. Determine that the encoded video frame does not need to be filtered.

During specific implementation, if the video encoding terminal does not need to filter the encoded video frame when determining that the video decoding terminal decodes the encoded video frame, a frame-level switch frame_flag corresponding to the encoded video frame is set to 0. The video encoding terminal writes information about the frame-level switch as indication information into the encoded data of the encoded video frame. When the frame-level switch frame_flag corresponding to the encoded video frame is 0, it indicates that the encoded video frame is not filtered during decoding, and the video decoding terminal does not filter the encoded video frame. When the frame-level switch frame_flag corresponding to the encoded video frame is 1, it indicates that the encoded data of the encoded video frame is filtered during decoding, and the video decoding terminal continues to obtain indication information for a region (a block) from the encoded data, and based on indication information of the region, filters the block that needs to be filtered.

S905. Determine, in the filtered blocks, an encoding block in the at least two encoding blocks corresponding to a filtered block whose gain is greater than the gain threshold as the encoding block that needs to be filtered in a case of decoding the encoded video frame.

Based on any one of the foregoing implementations, before step S503 is performed, the video encoding terminal may first determine whether the encoded video frame needs to be filtered when the video decoding terminal decodes the encoded video frame, and perform step S503 if determining that the encoded video frame needs to be filtered; and determine that step S503 does not need to be performed if determining that the encoded video frame does not need to be filtered.

Therefore, before step S503 is performed, the video encoding terminal may determine, in the following manner, whether the video decoding terminal needs to filter the encoded video frame: determining, based on a rate-distortion optimization algorithm and in a case that gains obtained by filtering the reconstructed video frame reach the second total gain threshold, whether to filter the encoded video frame when the video decoding terminal decodes the encoded video frame. Correspondingly, the video encoding terminal determines, based on a rate-distortion optimization algorithm and in a case that gains obtained by filtering the reconstructed video frame reach the second total gain threshold, whether to instruct to filter the encoded video frame in the encoded data of the encoded video frame during decoding, the total gain being a sum of the gains of the blocks whose gains are positive in the blocks; and performs step S503 if yes; otherwise, determines that the encoded video frame does not need to be filtered. For a specific implementation, refer to step S703 and step S903, and details are not described again.

During specific implementation, if determining that the video decoding terminal does not need to filter the encoded video frame, the video encoding terminal sets a frame-level switch frame_flag corresponding to the encoded video frame to 0, and writes information about the frame-level switch as indication information into the encoded data of the encoded video frame. When the frame-level switch frame_flag corresponding to the encoded video frame is 0, the video decoding terminal does not filter the encoded video frame.

Based on the rate-distortion optimization algorithm and the total gain of the filtered video frame, it is further determined whether to filter the encoded video frame, to improve the determining accuracy of the video frame.

In the solution in which the I frame is used for decoding, the I frame is a very critical reference frame. To ensure the subsequent video frame quality of the I frame, all blocks in the I frame may be filtered during decoding, to improve the quality of the I frame, and further ensure the quality of the entire video. Therefore, during specific implementation, whether all blocks of the I frame need to be filtered during decoding may be selected according to an actual application requirement.

When it is selected to filter all the blocks of the I frame, before step S503 is performed, whether a currently processed video frame is an I frame may be first determined. If the video frame is the I frame, blocks in the video frame are determined as blocks that need to be filtered during decoding; if the video frame is not the I frame, step S503 and subsequent steps are performed. For example, during the decoding efficiency optimization for current inter-frame prediction of AVS3 (under the RA and LDB configuration), to ensure that the performance is not degraded significantly, the blocks of the I frame are not screened, that is, all the blocks in the I frame need to be filtered.

When it is not selected to filter all the blocks of the I frame, before step S503 is performed, whether the currently processed video frame is the I frame does not need to be determined. That is, the processing manner of the I frame is the same as the processing manner of other frames. For the specific processing manner, refers to FIG. 5 to FIG. 9. For example, when the method in the embodiments of this disclosure is applicable to an intra-frame prediction frame and an AI (all intra) configuration, special processing may not be performed on the I frame. That is, a same screening operation is performed on all video frames.

Figure 10:
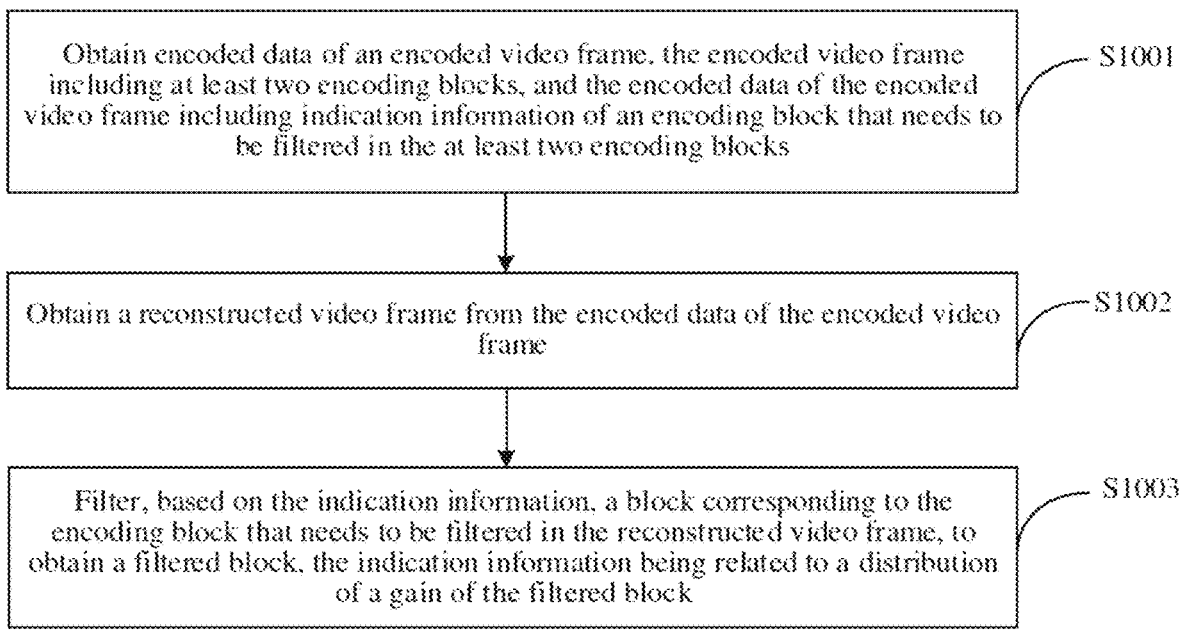
FIG. 10 is a schematic flowchart of an example video decoding method according to an embodiment of this disclosure.

Referring to FIG. 10, based on the inventive idea the same as that of the foregoing video encoding method, an embodiment of this disclosure further provides a video decoding method, specifically including the following steps:

S1001. Obtain encoded data of an encoded video frame, the encoded video frame including at least two encoding blocks, and the encoded data of the encoded video frame including indication information of an encoding block that needs to be filtered in the at least two encoding blocks.

During specific implementation, the encoding block that needs to be filtered indicated in the indication information is an encoding block whose gain after expected filtering is greater than a gain threshold, and the gain threshold may be determined according to a distribution of gains of filtered blocks corresponding to the at least two encoding blocks in the encoded video frame.

During specific implementation, for a specific implementation of determining the indication information of the video frame, refer to the methods shown in FIG. 5 to FIG. 9, and details are not described again.

S1002. Obtain a reconstructed video frame from the encoded data of the encoded video frame.

S1003. Filter, based on the indication information, a block corresponding to the encoding block that needs to be filtered in the reconstructed video frame, to obtain a filtered block, the indication information being related to a distribution of a gain of the filtered block.

During specific implementation, encoded data of each encoded video frame carries indication information, and the indication information is used for indicating which encoding block in the encoded video frame needs to be filtered. For example, the indication information may include a flag identifier corresponding to each encoding block in the encoded video frame. When a flag of the encoding block is 1, it indicates that the encoding block needs to be filtered during decoding. When the flag of the encoding block is 0, it indicates that the encoding block does not need to be filtered during decoding. In another example, the indication information may include a sequence number of the encoding block that needs to be filtered in the encoded video frame. For example, if the indication information includes sequence numbers 1, 4, and 5, it indicates that first, fourth, and fifth encoding blocks in the encoded video frame need to be filtered.

During specific implementation, the video encoding terminal writes the indication information into the encoded data, and sends the indication information to the video decoding terminal. The video decoding terminal obtains the reconstructed video frame from the encoded data, filters, based on the indication information in the encoded data, the encoding block that needs to be filtered in the reconstructed video frame, and obtains and plays a filtered video frame.

In the video decoding method in the embodiments of this disclosure, after completing encoding of a video frame, a video encoding terminal obtains a reconstructed video frame from encoded data of the encoded video frame, filters the reconstructed video frame, to obtain gains brought by filtering blocks in the reconstructed video frame, obtains an encoding block with a larger gain through screening after expected filtering corresponding to a block with a larger gain according to a distribution of the gains of the blocks, and sends indication information of the encoding block to the video decoding terminal, so that a video decoding terminal only filters the encoding block with the larger gain after expected filtering during decoding, and does not filter an encoding block with a smaller gain after expected filtering. On the premise of increasing the gains of the filtered video frame as much as possible, a quantity of encoding blocks participating in filtering is reduced. In a case that the video quality is hardly affected or the video quality is not obviously degraded, the decoding complexity is reduced, and the filtering efficiency is improved.

During specific implementation, the encoded data further includes frame-level switch information used for indicating whether the encoded video frame needs to be filtered, and Correspondingly, before step S1003 is performed, the video decoding method in the embodiments of this disclosure further includes the following steps: obtaining frame-level switch information from the encoded data, and performing step S1003 if the obtained frame-level switch information indicates that the encoded video frame needs to be filtered; and not performing step S1003 if the obtained frame-level switch information indicates that the encoded video frame does not need to be filtered. That is, the encoded video frame does not need to be filtered.

During specific implementation, the frame-level switch information may be represented by using a frame-level switch. If the frame-level switch frame_flag corresponding to the encoded video frame is 0, it indicates that the encoded video frame does not need to be filtered; and if the frame-level switch frame_flag corresponding to the encoded video frame is 1, it indicates that the encoded video frame needs to be filtered, and is then filtered according to the indication information of the encoding block.

During specific implementation, as mentioned above, the video encoding terminal may determine frame-level switch information in any of the following manners:

First manner: determining, based on a rate-distortion optimization algorithm and in a case that gains obtained by filtering the reconstructed video frame reach a first total gain threshold, whether the encoded video frame needs to be filtered during decoding, the first total gain threshold being a sum of the gains of the blocks whose gains are greater than the gain threshold in the filtered video frame.

Second manner: determining, based on a rate-distortion optimization algorithm and in a case that gains obtained by filtering the reconstructed video frame reach the second total gain threshold, whether the encoded video frame needs to be filtered during decoding.

Third manner: determining, based on the rate-distortion optimization algorithm and in a case that gains obtained by filtering the reconstructed video frame reach a total gain, whether the encoded video frame needs to be filtered during decoding, the total gain being a sum of the gains of the blocks whose gains are positive in the filtered video frame.

For specific implementation processes of the foregoing three manners, refer to the embodiments corresponding to the video decoding method, and details are not described again.

Based on the first total gain threshold, the second total gain threshold, or the total gain of the video frame, whether the video frame needs to be filtered is further determined, to improve the determining accuracy of the video frame.

Figure 11:
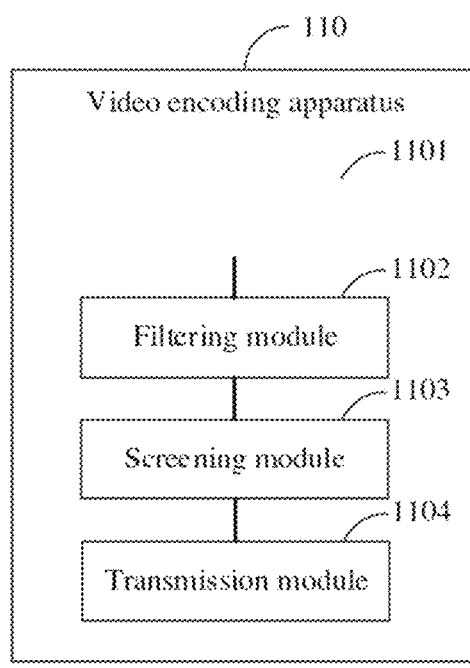
FIG. 11 is a schematic structural diagram of an example video encoding apparatus according to an embodiment of this disclosure.

As shown in FIG. 11, based on the inventive idea the same as that of the foregoing video encoding method, an embodiment of this disclosure further provides a video encoding apparatus 110, including a decoding module 1101, a filtering module 1102, a screening module 1103, and a transmission module 1104.

The term module (and other similar terms such as unit, submodule, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory) Likewise, a processor (or processors and memory) can be used to implement one or more modules. Moreover, each module can be part of an overall module that includes the functionalities of the module.

The decoding module 1101 is configured to obtain a reconstructed video frame from encoded data of an encoded video frame, the encoded video frame including at least two encoding blocks.

The filtering module 1102 is configured to filter the reconstructed video frame, to obtain gains obtained by filtering blocks in the reconstructed video frame, the filtered blocks being corresponding to the at least two encoding blocks.

The screening module 1103 is configured to determine, according to a distribution of the gains of the filtered blocks from the at least two encoding blocks, an encoding block that needs to be filtered in a case of decoding the encoded video frame.

The transmission module 1104 is configured to transmit the encoded data of the encoded video frame, the encoded data of the encoded video frame including indication information of an encoding block that needs to be filtered.

According to this embodiment of this disclosure, the screening module 1103 is specifically configured to: determine a gain threshold according to the distribution of the gains of the filtered blocks; and determine, in the filtered blocks, a filtered block whose gain is greater than the gain threshold as the encoding block that needs to be filtered in a case of decoding the encoded video frame.

According to this embodiment of this disclosure, the screening module 1103 is specifically configured to: obtain a gain statistical feature value based on gains of filtered blocks whose gains are positive in the filtered blocks; and determine a gain threshold according to the gain statistical feature value.

According to this embodiment of this disclosure, before the determining, in the filtered blocks, an encoding block in the at least two encoding blocks corresponding to a filtered block whose gain is greater than the gain threshold as the encoding block that needs to be filtered in a case of decoding the encoded video frame, the screening module 1103 is further configured to determine, based on a rate-distortion optimization algorithm and in a case that gains obtained by filtering the reconstructed video frame reach a first total gain threshold, to instruct to filter the encoded video frame in the encoded data of the encoded video frame during decoding, the first total gain threshold being a sum of the gains of the filtered blocks whose gains are greater than the gain threshold in the filtered blocks.

According to this embodiment of this disclosure, the screening module 1103 is specifically configured to:
  determine, according to the distribution of the gains of the filtered blocks, a total gain as a sum of the gains of the filtered blocks whose gains are positive in the filtered blocks;

obtain a second total gain threshold based on a product of a total gain retention ratio and the total gain; and accumulate the gains of the filtered blocks whose gains are positive in the filtered blocks one by one in descending order, to obtain an accumulated value, stop the accumulation in a case that the accumulated value is greater than or equal to the second total gain threshold, and determine a minimum gain in gains of at least two filtered blocks participating in the accumulation as the gain threshold.

According to this embodiment of this disclosure, the screening module 1103 is further configured to: determine the total gain retention ratio according to a ratio of a quantity of the filtered blocks whose gains are positive to a total quantity of the blocks in the reconstructed video frame; or determine the total gain retention ratio according to the gain statistical feature value of the filtered blocks whose gains are positive.

According to this embodiment of this disclosure, before the accumulating the gains of the filtered blocks whose gains are positive in the filtered blocks one by one, the screening module 1103 is further configured to determine, based on a rate-distortion optimization algorithm and in a case that gains obtained by filtering the reconstructed video frame reach the second total gain threshold, to instruct to filter the encoded video frame in the encoded data of the encoded video frame during decoding.

According to this embodiment of this disclosure, before the determining, according to a distribution of the gains of the filtered blocks from the at least two encoding blocks, an encoding block that needs to be filtered in a case of decoding the encoded video frame, the screening module 1103 is further configured to determine, based on the rate-distortion optimization algorithm and in a case that the gain obtained by filtering the reconstructed video frame reaches a total gain, to instruct to filter the encoded video frame in the encoded data of the encoded video frame during decoding, the total gain being a sum of the gains of the filtered blocks whose gains are positive in the filtered blocks.

The video encoding apparatus provided in the embodiments of this disclosure and the foregoing video encoding method use the same inventive idea, and the same beneficial effects can be obtained. Details are not described herein again.

Figure 12:
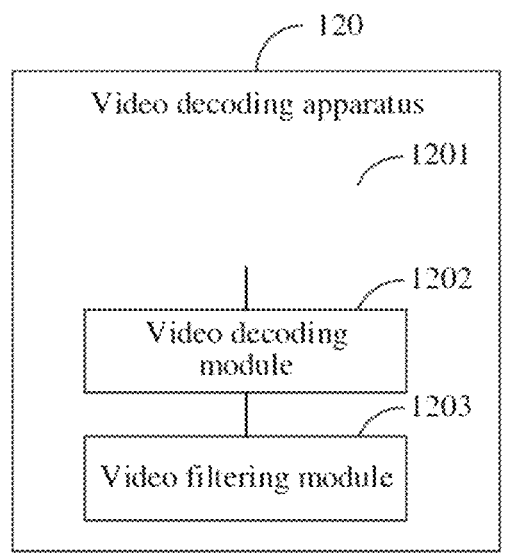
FIG. 12 is a schematic flowchart of an example video decoding apparatus according to an embodiment of this disclosure.

As shown in FIG. 12, based on the inventive idea the same as that of the foregoing video decoding method, an embodiment of this disclosure further provides a video decoding apparatus 120, including an obtaining module 1201, a video decoding module 1202, and a video filtering module 1203.

The obtaining module 1201 is configured to obtain encoded data of an encoded video frame, the encoded video frame including at least two encoding blocks, and the encoded data of the encoded video frame including indication information of an encoding block that needs to be filtered in the at least two encoding blocks.

The video decoding module 1202 is configured to obtain a reconstructed video frame from the encoded data of the encoded video frame.

The video filtering module 1203 is configured to filter, based on the indication information, a block corresponding to the encoding block that needs to be filtered in the reconstructed video frame, to obtain a filtered block, the indication information being related to a distribution of a gain of the filtered block.

According to this embodiment of this disclosure, the gain of the filtered block corresponding to the block that needs to be filtered indicated in the indication information is greater than a gain threshold, and the gain threshold is determined according to a distribution of gains of filtered blocks corresponding to the at least two encoding blocks.

According to this embodiment of this disclosure, the gain threshold is determined in the following manners:

obtaining a gain statistical feature value based on gains of corresponding filtered blocks whose gains are positive in the filtered blocks corresponding to the at least two encoding blocks; and determining a gain threshold according to the gain statistical feature value.

According to this embodiment of this disclosure, the encoded data further includes frame-level switch information used for indicating whether the encoded video frame needs to be filtered, and at a video encoding terminal, frame-level switch information is determined in the following manners: determining, based on a rate-distortion optimization algorithm and in a case that gains obtained by filtering the reconstructed video frame reach a first total gain threshold, whether the encoded video frame needs to be filtered during decoding, the first total gain threshold being a sum of the gains of the blocks whose gains are greater than the gain threshold in the filtered video frame.

Correspondingly, before the filtering, based on the indication information, a block that needs to be filtered in the reconstructed video frame, the video filtering module 1203 is further configured to determine that the frame-level switch information obtained from the encoded data indicates that the encoded video frame needs to be filtered.

According to this embodiment of this disclosure, the gain threshold is determined in the following manners:

determining, according to the distribution of the gains of the filtered blocks, a total gain as a sum of the gains of the filtered blocks whose gains are positive in the filtered blocks;

obtaining a second total gain threshold based on a product of a total gain retention ratio and the total gain; and accumulating the gains of the filtered blocks whose gains are positive in the filtered blocks one by one in descending order, to obtain an accumulated value, stopping the accumulation in a case that the accumulated value is greater than or equal to the second total gain threshold, and determining a minimum gain in gains of at least two filtered blocks participating in the accumulation as the gain threshold.

According to this embodiment of this disclosure, the total gain retention ratio is determined according to a ratio of a quantity of the filtered blocks whose gains are positive to a total quantity of the blocks in the reconstructed video frame; or the total gain retention ratio is determined according to the gain statistical feature value of the filtered blocks whose gains are positive.

According to this embodiment of this disclosure, the encoded data further includes frame-level switch information used for indicating whether the encoded video frame needs to be filtered, and the frame-level switch information is determined in the following manners: determining, based on a rate-distortion optimization algorithm and in a case that gains obtained by filtering the reconstructed video frame reach the second total gain threshold, whether the reconstructed video frame needs to filtered in the encoded data of the encoded video frame during decoding.

Correspondingly, before the filtering, based on the indication information, a block that needs to be filtered in the reconstructed video frame, the video filtering module 1203 is further configured to determine that the frame-level switch information obtained from the encoded data indicates that the encoded video frame corresponding to the reconstructed video frame needs to be filtered.

According to this embodiment of this disclosure, the encoded data further includes frame-level switch information used for indicating whether the encoded video frame needs to be filtered, and the frame-level switch information is determined in the following manners: determining, based on the rate-distortion optimization algorithm and in a case that gains obtained by filtering the reconstructed video frame reach a total gain, whether the reconstructed video frame needs to be filtered during decoding, the total gain being a sum of the gains of the blocks whose gains are positive.

Correspondingly, before the filtering, based on the indication information, a block that needs to be filtered in the reconstructed video frame, the video filtering module 1203 is further configured to determine that the frame-level switch information obtained from the encoded data indicates that the encoded video frame corresponding to the reconstructed video frame needs to be filtered.

The video decoding apparatus provided in the embodiments of this disclosure and the foregoing video decoding method use the same inventive idea, and the same beneficial effects can be obtained. Details are not described herein again.

Figure 13:
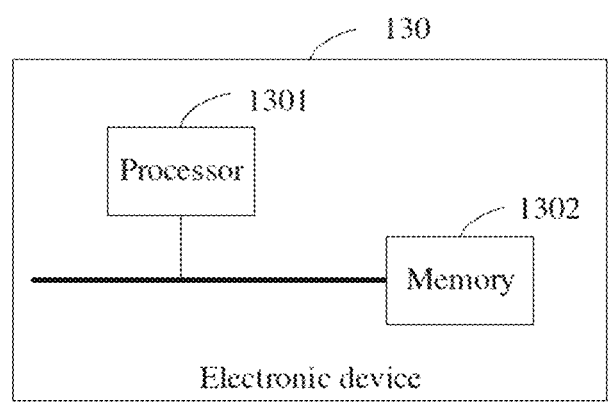
FIG. 13 is a schematic structural diagram of an example electronic device according to an embodiment of this disclosure.

Based on the same inventive idea in the foregoing video encoding method and video decoding method, an embodiment of this disclosure further provides an electronic device. The electronic device may specifically be the terminal device or the server shown in FIG. 4. As shown in FIG. 13, the electronic device 130 may include a processor 1301 and a memory 1302.

The processor 1301 may be a general-purpose processor, such as a central processing unit (CPU), a digital signal processor (DSP), an application-specific integrated circuit (ASIC), a field programmable gate array (FPGA), or another programmable logic device, a discrete gate or transistor logic device, or a discrete hardware component. The processor may implement or perform the methods, the steps, and logical block diagrams that are disclosed in the embodiments of this disclosure. The general-purpose processor may be a microprocessor, any conventional processor, or the like. Steps of the methods disclosed with reference to the embodiments of this disclosure may be directly performed and completed by a hardware processor, or may be performed and completed by using a combination of hardware and a software module in the processor.

The memory 1302, as a non-transitory computer-readable storage medium, may be configured to store a non-transitory software program, a non-transitory computer-executable program, and a module. The memory may include at least one type of storage media, for example, may include: a flash memory, a hard disk, a multimedia card, a card type memory, a random-access memory (RAM), a static random-access memory (SRAM), a programmable read-only memory (PROM), a read-only memory (ROM), an electrically erasable programmable read-only memory (EEPROM), a magnetic memory, a magnetic disk, an optical disc, and the like. The memory is any other medium that can carry or store expected program code in a form of an instruction or a data structure and can be accessed by a computer, but is not limited thereto. The memory 1302 according to this embodiment of this disclosure may be further a circuit or any other apparatus that can implement a storage function, and is configured to store program instructions and/or data.

An embodiment of this disclosure provides a computer-readable storage medium, configured to store computer program instructions used by the foregoing electronic device, and including a program for performing the foregoing video encoding method or video decoding method.

The foregoing computer-readable storage medium may be any computer-accessible usable medium or a data storage device, includes but not limited to: a magnetic memory (for example, a floppy disk, a hard disk, a magnetic tape, or a magneto-optical (MO) disk), an optical memory (for example, a CD, a DVD, a BD, or an HVD), and a semiconductor memory (for example, a ROM, an EPROM, an EEPROM, a non-volatile memory (NAND FLASH), or a solid-state disk (SSD)).

The foregoing embodiments are merely used for describing the technical solutions of this disclosure. The descriptions of the foregoing embodiments are merely intended to help understand the methods of the embodiments of this disclosure, and are not to be construed as a limitation on the embodiments of this disclosure. Any variation or replacement readily figured out by a person skilled in the art is to fall within the protection scope of the embodiments of this disclosure.

What is claimed is:

1. A video encoding method, comprising:
   obtaining a reconstructed video frame from encoded data of an encoded video frame, the encoded video frame comprising at least two encoding blocks;
   filtering the reconstructed video frame, to obtain filtering gains corresponding to the at least two encoding blocks;
   obtaining a filtering gain statistical feature value according to a distribution of the filtering gains that are positive;
   determining a filtering gain threshold according to the filtering gain statistical feature value;
   determining a target encoding block among the at least two encoding blocks that is to be filtered when being decoded at a decoder as corresponding to an encoding block having a filtering gain greater than the filtering gain threshold; and
   including into the encoded data of the encoded video frame, an indication information for indicating that the target encoding block is to be filtered.

2. The method according to claim 1, wherein before determining the target encoding block among the at least two encoding blocks, the method further comprises:
   determining, based on a rate-distortion optimization algorithm, when the filtering gains reach a total filtering gain threshold, to additionally instruct the decoder that the encoded video frame contains encoding blocks to be filtered during decoding, the total filtering gain threshold being for a sum of the filtering and being greater than the filtering gain threshold.

3. The method according to claim 1, wherein determining the filtering gain threshold comprises:
   determining, according to the distribution of the filtering gains, a total filtering gain as a sum of the filtering gains that are positive;
   obtaining a total filtering gain threshold based on a product of a total filtering gain retention ratio and the total filtering gain; and
   accumulating the filtering gains that are positive one by one in descending order, to obtain an accumulated value, stopping the accumulation when the accumulated value becomes greater than or equal to the total filtering gain threshold, and determining a minimum filtering gain contributed to the accumulation as the filtering gain threshold.

4. The method according to claim 3, further comprising:
determining the total filtering gain retention ratio according to a ratio of a number of the at least two encoding blocks whose filtering gains are positive to a total number of the at least two encoding blocks in the reconstructed video frame; or
determining the total filtering gain retention ratio according to the filtering gain statistical feature value.

5. The method according to claim 3, wherein before accumulating the filtering gains that are positive, the method further comprises:
determining, based on a rate-distortion optimization algorithm and when the filtering gains reach the total filtering gain threshold, to additionally instruct the decoder that the encoded video frame contains encoding blocks to be filtered during decoding.

6. The method according to any claim 1, wherein before determining the target encoding block, the method further comprises:
determining, based on a rate-distortion optimization algorithm and when the filtering gains reach a total gain, to instruct the decoder that the encoded video frame contains encoding blocks to be filtered during decoding, the total gain being a sum of the filtering gains that are positive.

7. A video decoding method, comprising:
obtaining encoded data of an encoded video frame, the encoded video frame comprising at least two encoding blocks, and the encoded data of the encoded video frame comprising indication information of an encoding block among the at least two encoding blocks, wherein:
the indication information indicates whether the encoding block needs to be filtered;
the indication information is determined according to whether the encoding block have a filtering gain greater than a filtering gain threshold;
the filtering gain threshold is determined according to a filtering gain statistical feature value; and
the filtering gain statistical feature value is obtained according to a distribution of filtering gains of the at least two encoding blocks that are positive;
obtaining a reconstructed video frame from the encoded data of the encoded video frame; and
filtering, based on the indication information, reconstructed data in the reconstructed video frame for the encoding block that needs to be filtered to obtain a filtered block.

8. A video encoding device, comprising a memory for storing computer instructions and a processor in communication with the memory, wherein the processor, when executing the computer instructions, is configured to cause the video encoding device to:
obtain a reconstructed video frame from encoded data of an encoded video frame, the encoded video frame comprising at least two encoding blocks;
filter the reconstructed video frame, to obtain filtering gains corresponding to the at least two encoding blocks;
obtain a filtering gain statistical feature value according to a distribution of the filtering gains that are positive;
determine a filtering gain threshold according to the filtering gain statistical feature value;
determine a target encoding block among the at least two encoding blocks that is to be filtered when being decoded at a decoder as corresponding to an encoding block having a filtering gain greater than the filtering gain threshold; and
include into the encoded data of the encoded video frame, an indication information for indicating that the target encoding block is to be filtered.

9. The video encoding device according to claim 8, wherein the processor is configured to cause the video encoding device, before determining the target encoding block among the at least two encoding blocks, to:
determine, based on a rate-distortion optimization algorithm, when the filtering gains reach a total filtering gain threshold, to additionally instruct the decoder that the encoded video frame contains encoding blocks to be filtered during decoding, the total filtering gain threshold being for a sum of the filtering and being greater than the filtering gain threshold.

10. The video encoding device according to claim 8, wherein to determine the filtering gain threshold comprises:
to determine, according to the distribution of the filtering gains, a total filtering gain as a sum of the filtering gains that are positive;
to obtain a total filtering gain threshold based on a product of a total filtering gain retention ratio and the total filtering gain; and
to accumulate the filtering gains that are positive one by one in descending order, to obtain an accumulated value, stopping the accumulation when the accumulated value becomes greater than or equal to the total filtering gain threshold, and determining a minimum filtering gain contributed to the accumulation as the filtering gain threshold.

11. The video encoding device according to any claim 8, wherein the processor is configured to cause the video encoding device, before determining the target encoding block among the at least two encoding blocks, to:
determine, based on a rate-distortion optimization algorithm and when the filtering gains reaches a total filtering gain, to instruct the decoder that the encoded video frame contains encoding blocks to be filtered during decoding, the total gain being a sum of the filtering gains that are positive.

12. A video decoding device, comprising a memory for storing computer instructions and a processor in communication with the memory, wherein the processor, when executing the computer instructions, is configured to cause the video decoding device to:
obtain encoded data of an encoded video frame, the encoded video frame comprising at least two encoding blocks, and the encoded data of the encoded video frame comprising indication information of an encoding block that needs to be filtered among the at least two encoding blocks, wherein:
the indication information indicates whether the encoding block needs to be filtered;
the indication information is determined according to whether the encoding block have a filtering gain greater than a filtering gain threshold;
the filtering gain threshold is determined according to a filtering gain statistical feature value; and
the filtering gain statistical feature value is obtained according to a distribution of filtering gains of the at least two encoding blocks that are positive;
obtain a reconstructed video frame from the encoded data of the encoded video frame; and filter, based on the indication information, reconstructed data in the reconstructed video frame for the encoding block that needs to be filtered to obtain a filtered block.

\* \* \* \* \*